US007381134B2

(12) United States Patent
Cuddy et al.

(10) Patent No.: US 7,381,134 B2
(45) Date of Patent: Jun. 3, 2008

(54) GAMING DEVICE HAVING A MULTI-FUNCTION FREE GAME BONUS

(75) Inventors: Ryan W. Cuddy, Reno, NV (US); Robert F. Bigelow, Jr., Reno, NV (US); James A. Vasquez, Carson City, NV (US); Paulina Rodgers, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 526 days.

(21) Appl. No.: 10/650,024

(22) Filed: Aug. 27, 2003

(65) Prior Publication Data

US 2004/0087359 A1 May 6, 2004

Related U.S. Application Data

(63) Continuation-in-part of application No. 10/086,146, filed on Feb. 28, 2002, now Pat. No. 7,258,611.

(51) Int. Cl.
*A63F 13/00* (2006.01)
*A63F 9/24* (2006.01)

(52) U.S. Cl. ............................ 463/25; 463/16; 463/20

(58) Field of Classification Search .................... 463/1, 463/16–22, 30–31
See application file for complete search history.

(56) References Cited

U.S. PATENT DOCUMENTS 4,624,459 A 11/1986 Kaufman
4,991,848 A 2/1991 Greenwood et al.
5,205,555 A 4/1993 Hamano
5,342,047 A 8/1994 Heidel et al.
5,393,057 A 2/1995 Marnell, II
5,407,200 A 4/1995 Zalabak
5,423,539 A 6/1995 Nagao
5,449,173 A * 9/1995 Thomas et al. ......... 273/143 R
5,456,465 A 10/1995 Durham (Continued)

FOREIGN PATENT DOCUMENTS

AU 199716432 B2 9/1997

(Continued)

OTHER PUBLICATIONS

3-Way Action Poker Brochure and Article written by IGT, published in 2002.

(Continued)

*Primary Examiner*—Robert E. Pezzuto
*Assistant Examiner*—Omkar A. Deodhar
(74) *Attorney, Agent, or Firm*—Bell, Boyd & Lloyd LLP

(57) ABSTRACT

An apparatus and method for a free spins game including a plurality of reels, an outcome and a plurality of sections associated with the outcome. The gaming device or player activates the reels to indicate a designated symbol combination including at least two section indicator symbols. When a designated symbol combination including the section indicator symbols is indicated on the reels, the gaming device obtains the corresponding section. The gaming device or player continues to activate the reels until there are no free spins remaining in the game or until all of the sections are obtained. The gaming device then provides the outcome to the player.

74 Claims, 15 Drawing Sheets

U.S. PATENT DOCUMENTS 5,560,603 A 10/1996 Seelig et al.
5,647,798 A 7/1997 Falciglia
5,732,948 A 3/1998 Yoseloff
5,772,506 A 6/1998 Marks et al.
5,775,692 A 7/1998 Watts et al.
5,788,573 A 8/1998 Baerlocher et al.
5,823,874 A 10/1998 Adams
5,833,537 A 11/1998 Barrie
5,848,932 A 12/1998 Adams
5,882,261 A 3/1999 Adams
5,919,088 A 7/1999 Weiss
5,935,002 A 8/1999 Falciglia
5,947,820 A 9/1999 Morro et al.
5,971,849 A 10/1999 Falciglia
5,980,384 A 11/1999 Barrie
6,004,207 A 12/1999 Wilson, Jr. et al.
6,012,982 A 1/2000 Piechowiak et al.
6,056,642 A 5/2000 Bennet
6,059,289 A 5/2000 Vancura
6,089,978 A 7/2000 Adams
6,102,400 A 8/2000 Scott et al.
6,117,009 A 9/2000 Yoseloff
6,126,542 A 10/2000 Fier
6,142,873 A 11/2000 Weiss et al.
6,149,521 A 11/2000 Sanduski
6,159,095 A 12/2000 Frohm et al.
6,159,097 A 12/2000 Gura
6,159,098 A 12/2000 Slomiany et al.
6,168,523 B1 1/2001 Piechowiak et al.
6,173,955 B1 1/2001 Perrie et al.
6,174,233 B1 1/2001 Sunaga et al.
6,190,254 B1 2/2001 Bennett
6,203,429 B1 3/2001 Demar et al.
6,220,959 B1 4/2001 Holmes, Jr. et al.
6,224,483 B1 5/2001 Mayeroff
6,231,442 B1 5/2001 Mayeroff
6,234,897 B1 5/2001 Frohm et al.
6,238,287 B1 5/2001 Komori et al.
6,238,288 B1 5/2001 Walker et al.
6,261,177 B1 7/2001 Bennett
6,270,411 B1 8/2001 Gura et al.
6,305,686 B1 10/2001 Perrie et al.
6,309,300 B1 10/2001 Glavich
6,315,660 B1 * 11/2001 DeMar et al. ................ 463/16
6,328,649 B1 12/2001 Randall et al.
6,334,814 B1 1/2002 Adams
6,336,860 B1 1/2002 Webb
6,336,863 B1 1/2002 Baerlocher et al.
6,340,158 B2 1/2002 Pierce et al.
6,346,043 B1 2/2002 Colin et al.
6,347,996 B1 2/2002 Gilmore et al.
6,364,766 B1 4/2002 Anderson et al.
6,368,216 B1 4/2002 Hedrick et al.
6,398,218 B1 6/2002 Vancura
6,398,644 B1 6/2002 Perrie et al.
6,406,369 B1 6/2002 Baerlocher et al.
6,413,160 B1 7/2002 Vancura
6,416,408 B2 7/2002 Tracy et al.
6,419,579 B1 7/2002 Bennett
6,435,511 B1 8/2002 Vancura et al.
6,443,452 B1 9/2002 Brune
6,454,651 B1 9/2002 Yoseloff
6,471,208 B2 10/2002 Yoseloff et al.
6,481,713 B2 11/2002 Perrie et al.
6,491,584 B2 12/2002 Graham et al.
6,506,118 B1 1/2003 Baerlocher et al.
6,514,141 B1 2/2003 Kaminkow et al.
6,533,658 B1 3/2003 Walker et al.
6,537,150 B1 3/2003 Luciano et al.
6,537,152 B2 3/2003 Seelig et al.
6,561,904 B2 5/2003 Locke et al.
6,565,436 B1 5/2003 Baerlocher
6,569,015 B1 5/2003 Baerlocher et al.
6,602,137 B2 8/2003 Kaminkow et al.
6,604,740 B1 8/2003 Singer et al.
6,688,977 B1 2/2004 Baerlocher et al.
6,719,630 B1 4/2004 Seelig et al.
6,733,389 B2 5/2004 Webb et al.
6,805,349 B2 10/2004 Baerlocher et al.
6,869,360 B2 3/2005 Marks et al.
6,913,532 B2 7/2005 Baerlocher et al.
6,955,600 B2 10/2005 Glavich et al.
7,070,501 B2 7/2006 Cormack et al.
7,238,110 B2 7/2007 Glavich et al.
2001/0009865 A1 7/2001 Demar et al.
2002/0010017 A1 1/2002 Bennett
2003/0054875 A1 3/2003 Marks et al.
2003/0060272 A1 3/2003 Galvich et al.
2003/0073483 A1 4/2003 Glavich et al.
2005/0049035 A1 3/2005 Baerlocher et al.

FOREIGN PATENT DOCUMENTS

AU A-50327/96 10/1997
AU A-63553/98 10/1998
EP 0 688 002 A1 12/1995
EP 0 798 676 A1 10/1997
EP 0 874 337 A1 10/1998
EP 0 944 030 A2 3/1999
EP 0 926 645 A2 6/1999
EP 0 945 837 A2 9/1999
EP 0 981 119 A2 2/2000
EP 0 984 409 A2 3/2000
GB 2 322 217 A 8/1998
GB 2 328 311 A 2/1999
WO WO 00 12186 3/2000
WO WO 00/32286 6/2000
WO WO 01/26019 A1 4/2001

OTHER PUBLICATIONS

Addams Family Advertisement written by Strictly Slots, published in Jul. 2000.
American Thunder Screen Shots written by IGT, published in 2001.
Bally Slots Machines Electro-Mechanicals 1964-1980 Book, Revised 3rd Edition [In Part] written by Marshall Fey.
Bonus Times Article written by Bally Gaming, published in Jul. 2000.
Cash Crop Brochure written by Aristocrat Leisure Industries, published in 1997.
Cuckoo Aristocrat Brochure written by Aristocrat, published in Feb. 1998.
Dolphin Treasure Advertisement written by Aristocrat Leisure Industries Pty. Ltd, published in 1994.
DoubleBucks Brochure written by IGT, published date not known.
Field Testing New Slots Article, written by Strictly Slots, published in Jul. 2000.
Ghoulish Gamble Advertisement written by Strictly Slots, published in Nov. 2000.
Leopard Spots™ (website) writtten by www.igt.com, printed Mar. 21, 2001.
Mega Multiplier® (website) written by www.wmsgaming.com, printed on May 22, 2001.
Money Grab (website) written by www.wmsgaming.com, printed on May 22, 2001.
Money Mouse Brochure written by Artist O Crat Leisure Industries, published in 1997.
Monopoly Brochures and Articles written by WMS Gaming, Inc. published in 1998.
Monopoly Party Train Article written by Strictly Slots, published in Feb. 2002.
Polly & Roger Brochure written by VLC, Inc, published in 2000.
Roll & Win Advertisement written by WMS Gaming, wmsgaming.com, printed Jun. 8, 2001.

Take Your Pick Article written by Strictly Slots, published Mar. 2001.
Top Cat Brochure written by WMS Gaming, Inc., published date not known.
Treasure Tunnel Treasure Wheel Brochure written by Sigma Game, Inc., published in 2001.
Vision Series™/Good Times™ Brochure written by IGT, published in 1999.
X Factor Brochure and Website Page written by WMS Gaming, Inc., published in 1998 and 2000.
Yahtzee Video Game Advertisement written by Mikohn Winning Solutions Worldwide, published in 1999.
Catch A Wave Advertisement written by IGT, published in Dec. 2000.
Doplhin Treasure Advertisement written by Aristocrat Leisure Industries Pty. Ltd, published in 1996.
Spin Till You Win Game Description written by IGT, published in 1996.
Top Dollar Advertisement written by IGT, published in 1998.
Triple Bucks Advertisement written by IGT, published in 1999.
Winning Bid Advertisement written by WMS Gaming, Inc., published prior to Jan. 2001.

* cited by examiner

GAMING DEVICE HAVING A MULTI-FUNCTION FREE GAME BONUS

PRIORITY CLAIM

This application is a continuation-in-part and claims the benefit of U.S. patent aplication Ser. No. 10/086,146, filed Feb. 28, 2002 now U.S. Pat. No. 7,258,611.

CROSS REFERENCE TO RELATED APPLICATIONS

This application is related to the following commonly-owned patent applications: "Gaming Device Having Separately Changeable Value And Modifier Bonus Scheme," Ser. No. 10/767,484, "Gaming Device With Bonus Scheme Having Multiple Award Levels," Ser. No. 10/763,430, "Gaming Device Having A Re-triggering Symbol Bonus Scheme With A Bonus Symbol Accumulator And Player Selection Of Accumulation Total," Ser. No. 10/952,656, "Gaming Device Having A Re-triggering Symbol Bonus Scheme," Ser. No. 11/156,112, and "Gaming Device Having A Re-triggering Symbol Bonus Scheme With A Bonus Symbol Accumulator," Ser. No. 11/196,930.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a free game bonus with a multiplier that obtains for each free game.

BACKGROUND OF THE INVENTION

Gaming machine manufacturers constantly strive to make gaming machines that maximize enjoyment and excitement for players. Providing a bonus game in which a player has an opportunity to win potentially large awards or credits in addition to the awards associated with the base game of the gaming machine is one way to enhance player enjoyment and excitement.

Known gaming devices having bonus games employ a triggering event that occurs during play of the base game of the gaming device. The triggering event temporarily stalls or halts the base game play and enables a player to enter a second, different game, which is the bonus game. The player plays the bonus game, likely receives an award, and returns to the base game.

Bonus games that provide players with large awards or the potential to win large awards are especially attractive to players. One way that gaming device manufacturers provide larger or more frequently occurring awards in slot gaming machines is by providing free spins to a player. Several known games provide players a number of free spins at the beginning of the game and spin the reels to obtain awards. This type of bonus game is described in European Patent Application No. EP 0874337A1 and European Patent No. EP 0984409A2. These games are generally versions of a "Spin Until" type bonus game.

EP 0874337A1 discloses a gaming device having a bonus game where the player spins a plurality of reels including several symbols. In the bonus game, if the player obtains a winning symbol combination on the reels, the player receives an award and spins again. The probability for obtaining a winning symbol combination on the reels is greater than fifty percent. Therefore, a player will likely have multiple opportunities to spin the reels in the bonus game and to receive several awards. If the player does not obtain a winning symbol combination, the bonus game ends and the player receives the total accumulated awards for the bonus game. Thus, the player spins the reels in the bonus game until they do not obtain a winning combination.

EP 0984409A2 discloses a gaming device wherein the game enables the player to spin a plurality of reels having various symbols attempting to obtain awards. In this bonus game, the player starts the bonus game with a limited number of spins. The player spins the reels until there are no spins remaining. The player receives an award after each spin. The final award in the bonus game is the total of all of the awards accumulated by the player in the game.

Another way that gaming device manufacturers provide larger awards to players is by using multipliers. A multiplier increases the award amount proportionally to the value of the multiplier. For example, a "2×" multiplier pays twice the normal award value. A "3×" multiplier pays three times the normal award value. A multiplier can substantially increase a player's award. Some games also employ an incrementing multiplier as described in the following paragraphs.

U.S. Pat. No. 6,004,207 discloses a slot machine that provides a multiplied payout when certain symbols or symbol combinations appear on the reels and a player bets the maximum amount of coins. This bonus game includes a plurality of reels including several symbols on the reels and a multiplier. The symbols include multiplier symbols and Power Point symbols. Initially, the bonus game sets the multiplier at a predetermined level. The multiplier increments by one level when the player obtains ten Power Point symbols on the reels from one or more spins. After the multiplier increases in value, the player needs ten more Power Point symbols to increment the multiplier again. The gaming device also enables a player to spin the reels to obtain a winning symbol combination. If the player obtains a winning combination, the gaming device provides the player with an award. If the winning combination includes a multiplier symbol, the award is multiplied by the multiplier. Once an award is multiplied by the multiplier, the multiplier resets to a predetermined level.

Another type of bonus game that includes a multiplied payout is the "GOOD TIMES" gaming device which is manufactured by the assignee of this patent application. This game includes three reels having a plurality of symbols and blank spaces. The symbols include a plurality of "Good Times" symbols. The bonus includes two multiplier groups. A first multiplier group starts at "1×" (or one times the award) and goes up to "12×" (or twelve times the award). The second multiplier group starts at "1×" and goes up to "144×" (or one hundred forty-four times the award). Each time a player spins the reels and obtains three blank spaces on a payline, the designated multiplier in each multiplier increments one level. When the player obtains a winning combination, the player receives an award. If a "Good Times" symbol appears in the winning combination, the player's award is multiplied by the designated multiplier in the first bonus table. If two "Good Times" symbols appear in the winning combination, the player's award is multiplied by the designated multiplier in the second bonus group.

It should be appreciated that multipliers may substantially elevate award returns and increase player excitement and enjoyment. Players enjoy playing for high bonus awards. Thus, it is desirable to have a bonus game of a gaming device that provides several opportunities to play a bonus game and has the potential to accumulate large awards.

SUMMARY OF THE INVENTION

The present invention relates in general to a gaming device having a bonus game or scheme, and more particularly to a gaming device having a bonus game or scheme including a plurality of reels, a plurality of symbols on the reels, a plurality of free spins of the reels and a plurality of multipliers associated with the free spins.

In one embodiment, the gaming device provides the player with a plurality of free spins of the reels in the bonus game. A multiplier is associated with each spin of the reels. The multiplier obtains and preferably increases after each spin. The processor in the gaming device spins the reels and determines if the player obtains an award based on the combination of symbols on the reels. If the player obtains an award, the award is modified by the multiplier associated with that spin of the reels. In another embodiment, a consolation award is provided to the player if the player does not receive an award after a spin of the reels. In a further embodiment, an accumulated award is provided to the player after there are no spins remaining in the game. The accumulated award may include a plurality of the awards provided to the player or all of the awards provided to the player during the game.

In one embodiment, the multiplier increases by one after each spin. In other embodiments, the multiplier increases by more than one or as desired by the game implementor. In other embodiments, the increase of the multiplier is randomly determined. In one alternative embodiment, the multiplier increases after non-winning games.

In one embodiment, a plurality of reels having several symbols are displayed to a player. The multiplier is also displayed to the player. The player starts the game with a predetermined number of spins in the game. The number of spins may be determined randomly, predefined or picked by playing a sub-game such as by having the player choose from a plurality of masked selections each having an associated number of spins. To start the bonus game, the processor spins or enables the player to initiate a spin of the reels attempting to obtain an award based on a combination of symbols on the reels. If the player obtains an award, the award is modified by the related multiplier. In one embodiment, the multiplier starts at "1×" for the first spin and increases with each spin. After each spin, the multiplier is incrementally increased by one. Therefore, each subsequent spin has a larger multiplier. The player continues to spin the reels until there are no spins remaining.

In another embodiment, the gaming device provides the player with additional spins based upon the occurrence of one or more symbols on the reels.

In a further embodiment, the plurality of reels includes a plurality of symbols including at least one, and preferably a plurality of incrementor symbols. The multiplier obtains and preferably increases (such as by one) each time the incrementor symbol appears on the display or on a payline associated with the reels. In another alternative embodiment, if one or more incrementor symbols are displayed by the reels, the multiplier increases by the number of incrementor symbols that are displayed on the reels.

In one embodiment, the multiplier of the present invention is employed in a poker game. In another embodiment, the multiplier of the present invention is employed in a keno game.

In one alternative embodiment, the multiplier is predetermined by the processor at the beginning of the bonus game. Then, the multiplier may increase by a predetermined amount or a random amount after each game.

In another alternative embodiment, the multiplier is randomly determined at the beginning of the bonus game and then randomly determined after each subsequent game. The processor or player may select the new multiplier. In one embodiment, the gaming device displays a plurality of player selectable selections to the player. The selections are masked or hidden from the player and when selected, display a multiplier to the player. The multipliers are randomly associated with the selections. The player may pick one or a plurality of selections. In another embodiment, the selections are only displayed to the player after a specific symbol combination occurs on the reels.

In one alternative embodiment, a light display is mounted to the gaming device and displays the multiplier to the player after the processor randomly selects the multiplier.

In another alternative embodiment, different increases of the multiplier and different probabilities are associated with different incrementor symbols such that one incrementor symbol has a greater probability of appearing on the reels than another incrementor symbol.

In an alternative embodiment of the present invention, the gaming device provides a plurality of free spins, a plurality of reels activated by the free spins, an outcome and a plurality of sections associated with the outcome. The reels include a plurality of symbols including a plurality of section indicator symbols. The gaming device obtains at least one of the sections associated with the outcome by removing the section when a designated symbol combination including the section indicator symbols associated with the section are indicated on the reels. The section may be removed or altered in any suitable manner. In one embodiment, the gaming device provides an award or awards to the player for each section that is removed in the game. It should be appreciated that the award may be any suitable award such as a free spin game, a game element, a value, a credit or any other suitable award. The gaming device or player continues to spin the reels until there are no free spins remaining in the game or until all of the sections are obtained. The gaming device then reveals and provides the outcome to the player and the game ends. In another embodiment, the gaming device provides a new outcome associated with a plurality of sections to the player when the player has free spins remaining in the game and enables the player to continue to activate the reels until there are no free spins remaining.

In one embodiment, the gaming device provides a modifier such as a multiplier at the beginning of the game which increments when a designated symbol combination or combinations are indicated on the reels. In one embodiment, the game begins with a base multiplier and the base multiplier increments for each designated symbol combination indicated on the reels. In another embodiment, the multiplier increments for a plurality of designated symbol combinations indicated on the reels. It should be appreciated that the multiplier may increase, decrease or remain unchanged in one or a plurality of free spins of the reels. It should also be appreciated that the multiplier may increment by a predetermined amount or a random amount. In another embodiment, the modifier or multiplier increments when one or a plurality of modifier symbols occur on the reels. The multiplier multiplies the outcomes or awards received by the player for each designated symbol combination indicated on the reels. The multiplied outcomes are summed or otherwise combined and provided to the player. In a further embodiment, the gaming device sums or otherwise combines the outcomes or awards received for each designated symbol combination on the reels and multiplies the summed or total outcome by the multiplier at the end of the game to provide the total outcome or award to the player for the game. The multiplier thereby enhances the award or outcome provided to the player in the game.

In another embodiment, the gaming device provides at least one additional free spin to the player for each designated symbol combination indicated on the reels. The additional free spin enables the player to have additional chances to obtain an outcome or outcomes in a game. In another embodiment, the gaming device provides at least one free spin to the player for a plurality of designated symbol combinations indicated on the reels. In a further embodiment, the gaming device provides at least one free spin to a player when at least one free spins symbol occurs on the reels. It should be appreciated that any suitable number of free spins may be provided to the player in the game.

In one embodiment, any section indicator symbols associated with a section that is obtained in the game are removed or eliminated from the reels. Therefore, only the section indicator symbols associated with sections that have not been obtained in the game, remain on the reels in the game. This enhances the probability that the player will obtain the designated symbol combinations needed to obtain the remaining sections and reveal the outcome in the game. This further increases a player's excitement and enjoyment of the game because the opportunity of obtaining another award and revealing the outcome in the game increases.

In another embodiment, the symbols includes at least one wild symbol. If at least two wild symbols or a designated combination of the wild symbols are indicated on the reels, the gaming device automatically obtains all of the sections and reveals the outcome to the player. It should be appreciated that the wild symbol or the designated combination of wild symbols may cause the gaming device to obtain one, a plurality or all of the sections in the game.

In an alternative embodiment, there is a weighted probability of increasing the multiplier by more than one.

It is therefore an advantage of the present invention to provide a gaming device having a free game bonus with a multiplier that increments after each game.

Another advantage of the present invention is to provide a gaming device including a multiplier that increments after each game to provide larger awards to players.

It is a further advantage of the present invention to provide a gaming device including an outcome concealed by different sections which are independently obtained during a game.

Another advantage of the present invention is to provide a gaming device which eliminates symbols from a plurality of reels to increase the probability of indicating subsequent symbol combinations on the reels.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
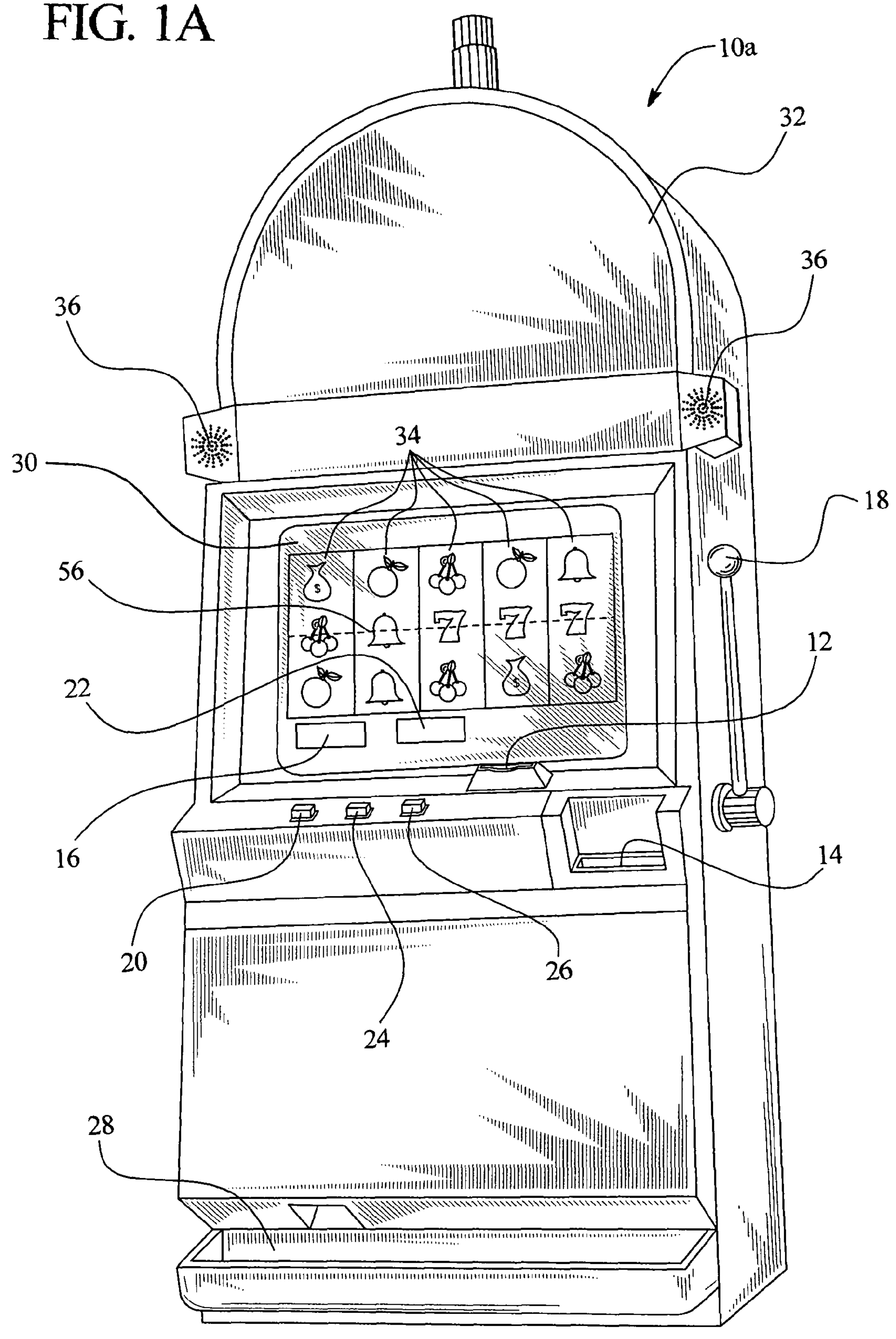
FIG. 1A is a front perspective view of one embodiment of the gaming device of the present invention.
Figure 1B:
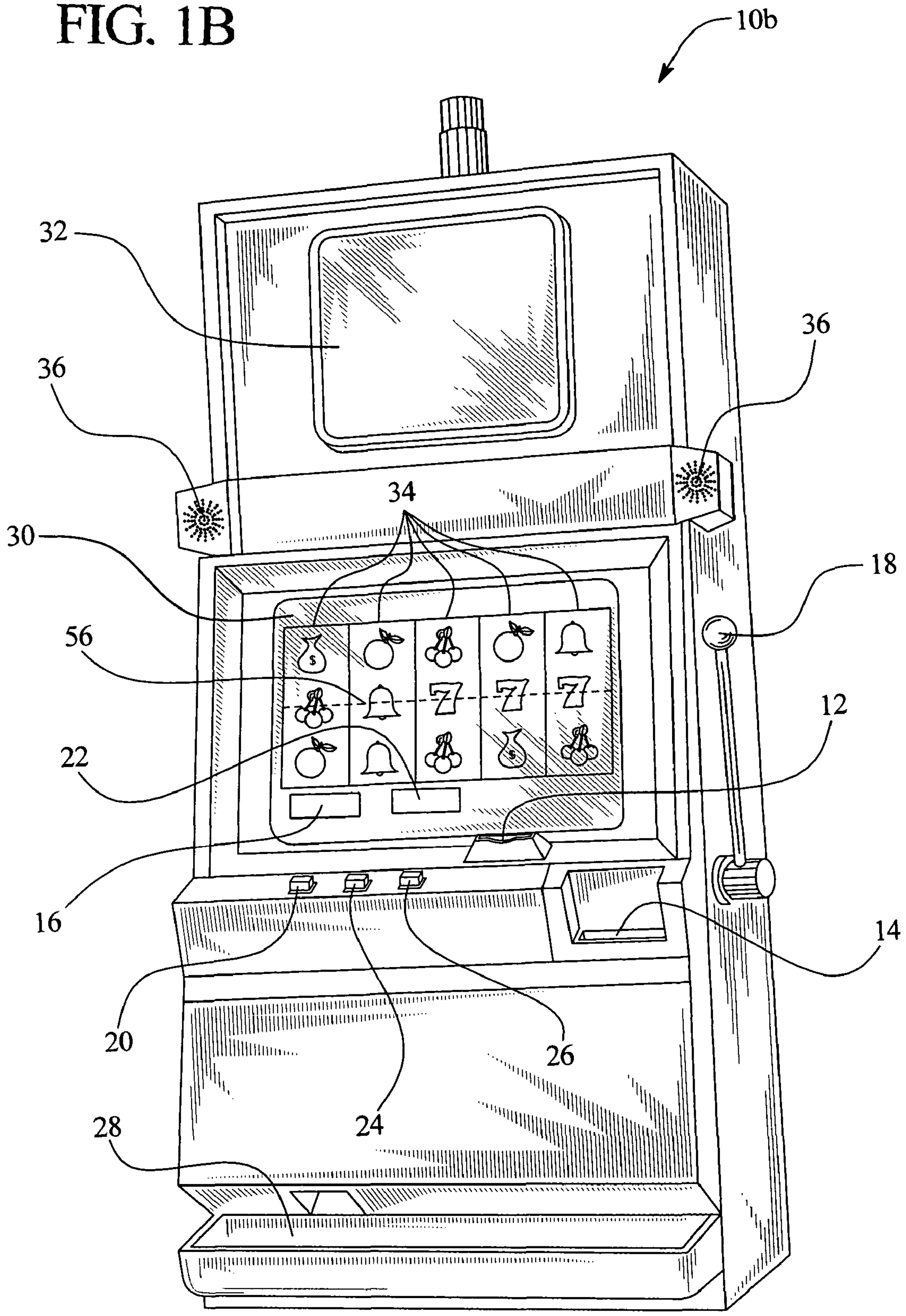
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is, in one embodiment, a slot machine having the controls, displays and features of a conventional slot machine. It is constructed so that a player can operate it while standing or sitting, and gaming device 10 is preferably mounted on a console or cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker, blackjack or keno, any of their bonus triggering events and any of the bonus round games. The symbols and indicia used on and in gaming device 10 may be in mechanical, electronic, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 in one embodiment displays a plurality of reels 34, such as three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images or symbols which preferably correspond to a theme associated with the gaming device 10. Furthermore, gaming device 10 preferably includes speakers 36 for making sounds or playing music.

Figure 2:
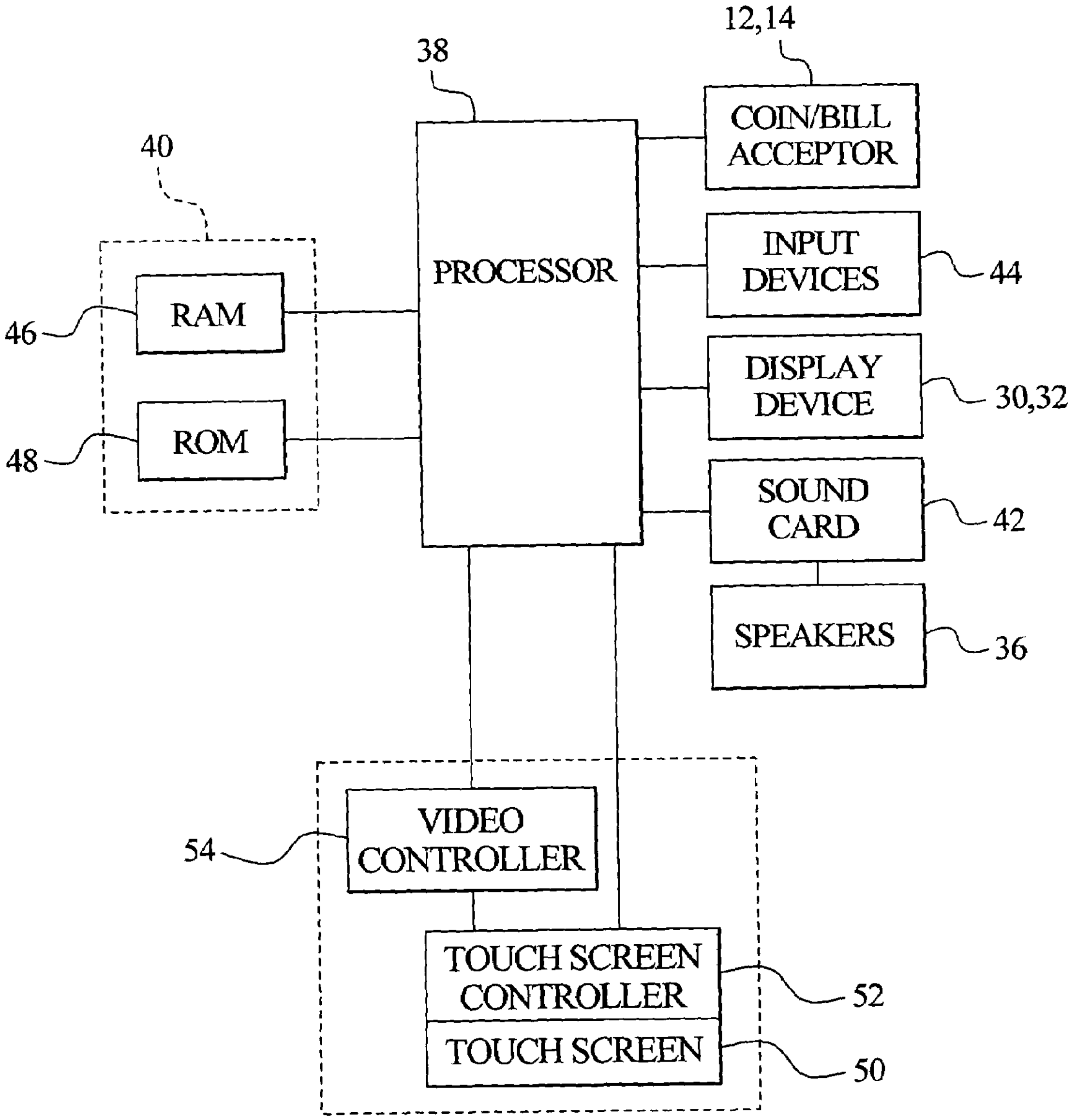
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively, and/or individually, referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 may use a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Free Game Bonus

Figure 3:
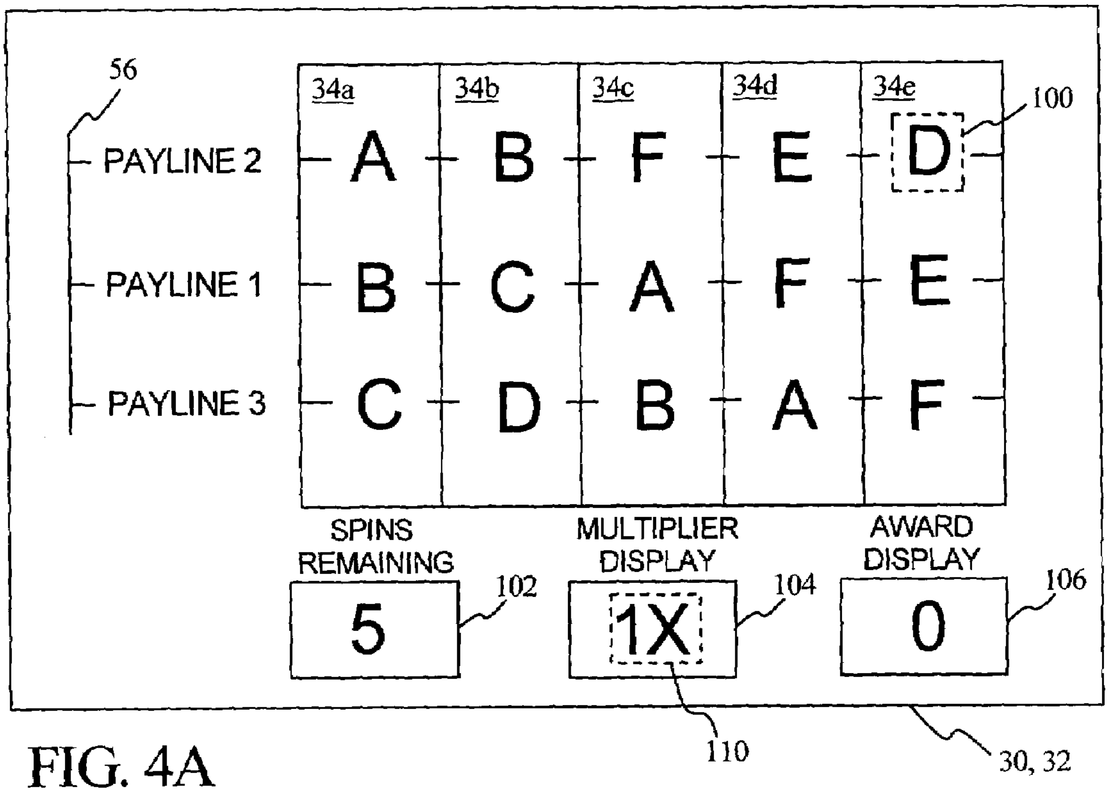
FIG. 3 is an enlarged front elevation view of a display illustrating one embodiment of the present invention.

Referring now to FIG. 3, one embodiment of the present invention includes a plurality of reels 34*a* to 34*e* and one or more associated paylines 56 displayed by a video monitor 30 or 32 (FIGS. 1A or 1B). Each reel 34 has a plurality of symbols A through F generally designated by numeral 100. It should be appreciated that the symbols may be any suitable symbol. A spins remaining display 102 initially indicates the number of free spins provided to the player by the processor to start the bonus game. The number of free spins or activations could be predetermined, randomly determined, or based on various factors such as the player's wager in the base game. Thereafter, the spins remaining display 102 indicates the number of free spins remaining in the bonus game. It should be appreciated that the player may be provided with additional free spins during a game, where the free spins are based on the occurrence of one or more symbols on the reels.

The multiplier display 104 displays the multiplier associated with a particular free spin or activation of the reels. In one embodiment, the multiplier associated with each free spin increases by a predetermined amount. In another embodiment, the amount of the increase is an amount selected from a range greater than zero and less than ten after each free spin of the reels. In a further embodiment, the multiplier associated with each free spin increases by a random amount.

The award display 106 displays the total award, or the value of the accumulated awards, during the bonus game. The award value indicated by award display 106 at the end of a game is the award that the player receives for that bonus game.

Referring now to FIGS. 4A through 4E, an example of this embodiment of the present invention is illustrated where the gaming device provides a player with five free spins and a "1×" multiplier to begin the bonus game. In this embodiment, the game starts with a "1×" multiplier. However, it should be appreciated that the game could start with any multiplier desired by the game implementor. It should also be appreciated that the starting multiplier could be randomly determined or based on another factor such as the player's wager in the primary game. It should be appreciated that any pay table or award table may be used in the bonus game. The pay table for this example is as follows: three of the same symbols along payline one awards twenty-five, four of the same symbols along payline one awards fifty, and five of the same symbols along payline one awards 100 to a player. The bonus game is not limited to payline one and it should be appreciated that another payline or combination of paylines 56 may be used to trigger the bonus award.

In one embodiment, a consolation award is provided to the player if the player does not receive an award after a free spin. In one aspect of this embodiment, the consolation award is predetermined by the processor. In another aspect, the consolation award is randomly determined by the processor. In a further aspect of the present invention, the consolation award is based on the multiplier associated with each free spin of the reels.

In another embodiment, an accumulated award is provided to the player after there are no spins remaining in the game. The accumulated award is based on the awards, if any, provided to the player after each spin. The accumulated award may include a plurality of the awards provided to the player or all of the awards provided to the player.

Figure 4A:
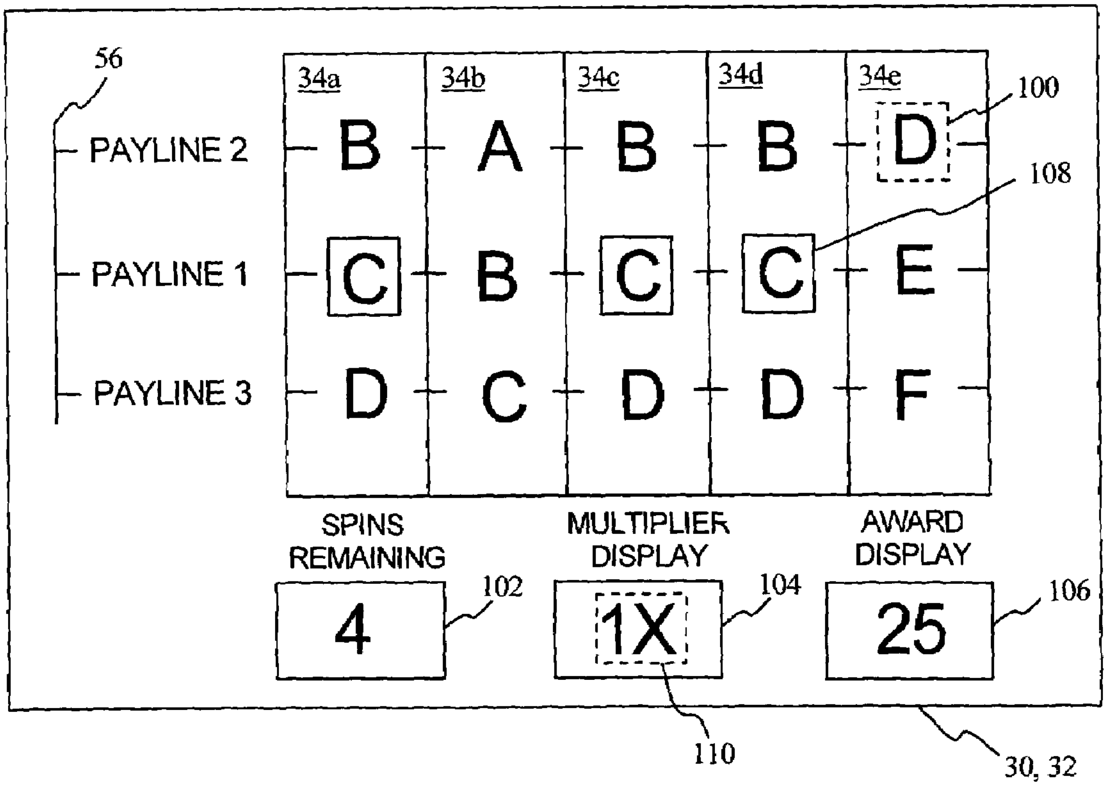
FIGS. 4A, 4B, 4C, 4D and 4E are enlarged front elevation views of a display illustrating an example game of one embodiment of the present invention.

The player starts the secondary or bonus game by spinning the reels. FIG. 4A illustrates the first spin by the player in the bonus game. In the first spin, the player obtained three "C" symbols 108 along payline one. According to the pay table described above, the player receives an award of twenty-five. Because the multiplier 110 is "1×" or multiplies the award value by one, the player's award for that spin remains twenty-five. The award value, twenty-five, is transferred to the award display 106 as illustrated in FIG. 4A. The player now has four spins remaining as shown in spin display 102 as illustrated in FIG. 4A. The processor increments the multiplier by one prior to the next free spin. The multiplier is "2×" for the next free spin.

Figure 4B:
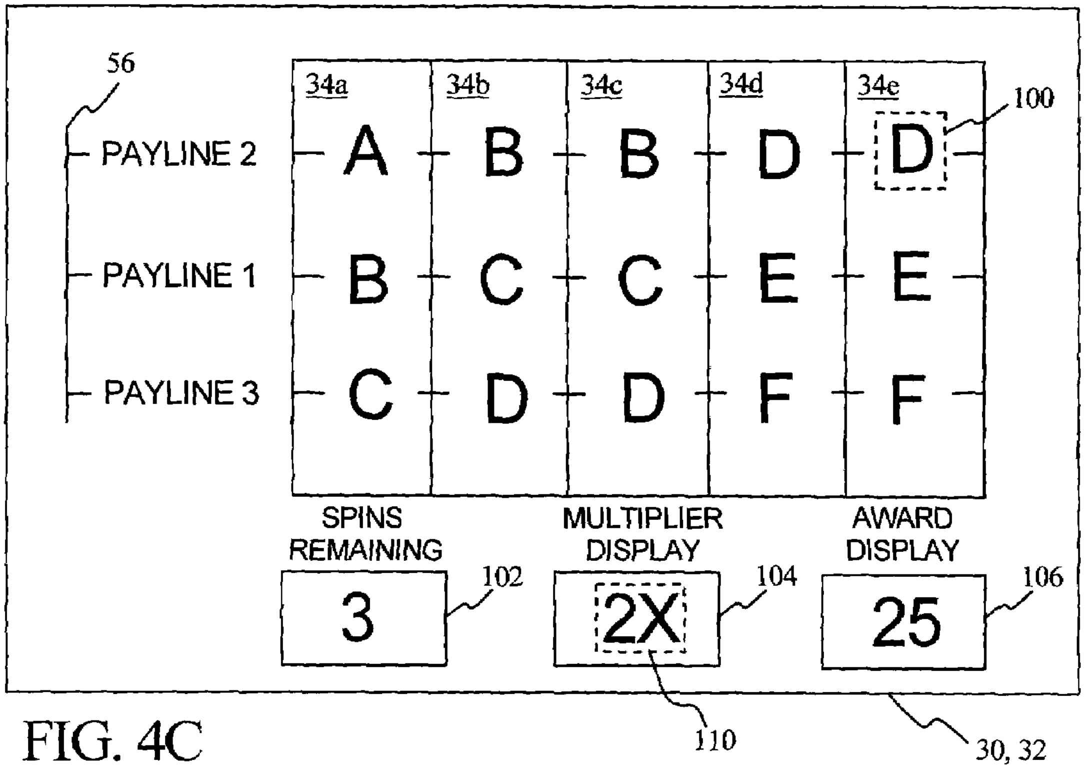

Referring now to FIG. 4B, the player uses their second free spin to spin the reels 34 in the bonus game. After spinning the reels, the player only obtained two "C" symbols and two "E" symbols on payline one. Because this combination of symbols is not an award combination, the player does not receive an award for this spin. Because the player did not obtain an award after the second spin, the player's award total does not obtain as indicated by the award display 106. The player now has only three spins remaining in the bonus game as indicated by spin remaining display 102. The processor increments the multiplier prior to the next free spin. The multiplier is now "3×."

Figure 4C:
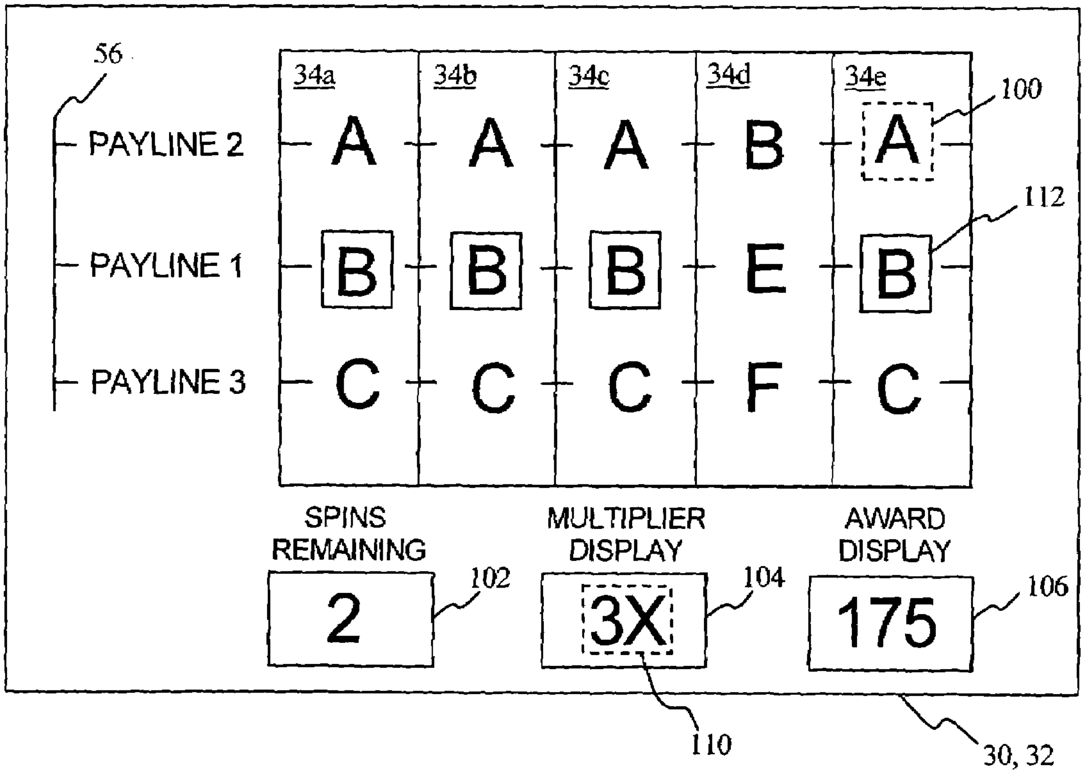

Referring to FIG. 4C, the multiplier 110 for this spin is "3×," or three times an award value, as indicated by multiplier display 104. It should be appreciated that in this embodiment, the multiplier continues to increment by one after each spin, regardless of whether the player obtains an award or not. The multiplier may alternatively obtain as discussed below. The player spins the reels 34 again and obtains four "B" symbols 112 along payline one. The four "B" symbols provide an award of fifty to the player. In addition, the award value, fifty, is multiplied by three because the multiplier for this spin is "3×." Thus, the player receives a total award of 150 for the third spin in the bonus game. Furthermore, the award brings the player's total award to 175 as shown in award display 106. This spin shows how a player may accumulate much larger awards based on the incrementing multiplier even though some spins do not result in awards. The player has 2 free spins remaining as indicated by spin remaining display 102. The gaming device increments the multiplier to "4×" prior to the next free spin.

Figure 4D:
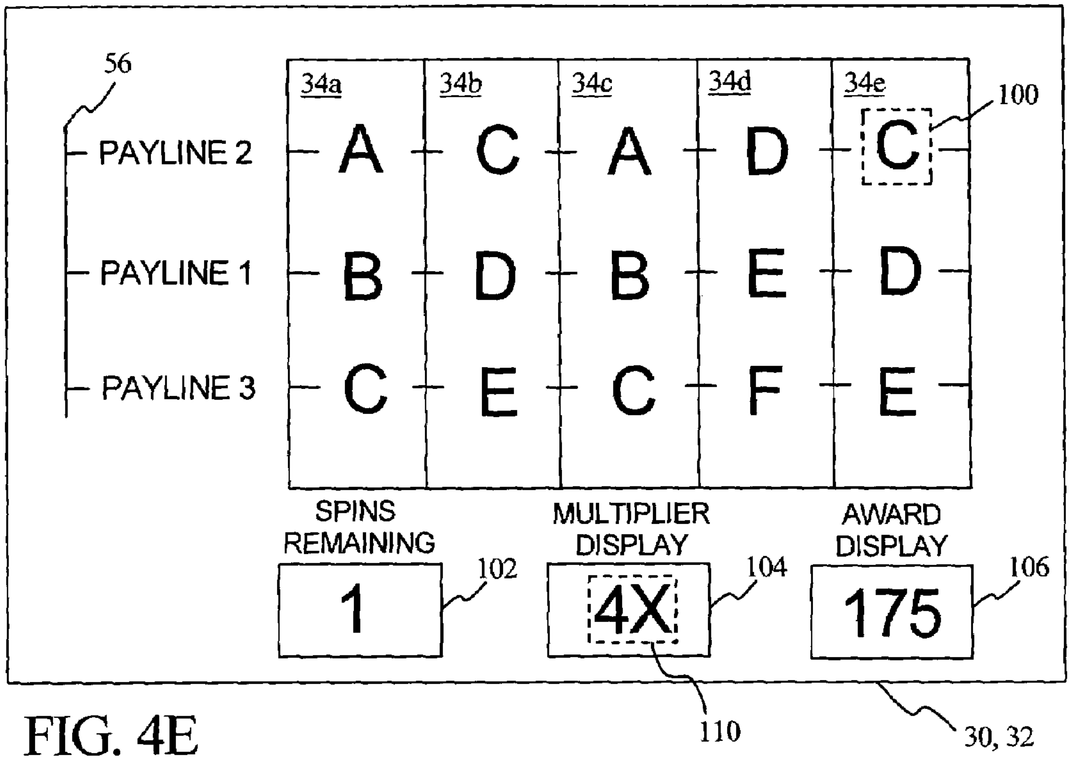

Referring now to FIG. 4D, the potential award for this spin increases substantially because the multiplier 110 continues to increment after each spin. The multiplier is "4×" which will multiply any award that the player receives for this spin by four. The player spins the reels 34, however, the player fails to obtain any award after this spin. The total award, 175, remains unchanged as shown in award display 106 and the player has only one spin remaining in the bonus game. The gaming device increments the multiplier 110 to "5×" before the next free spin.

Figure 4E:
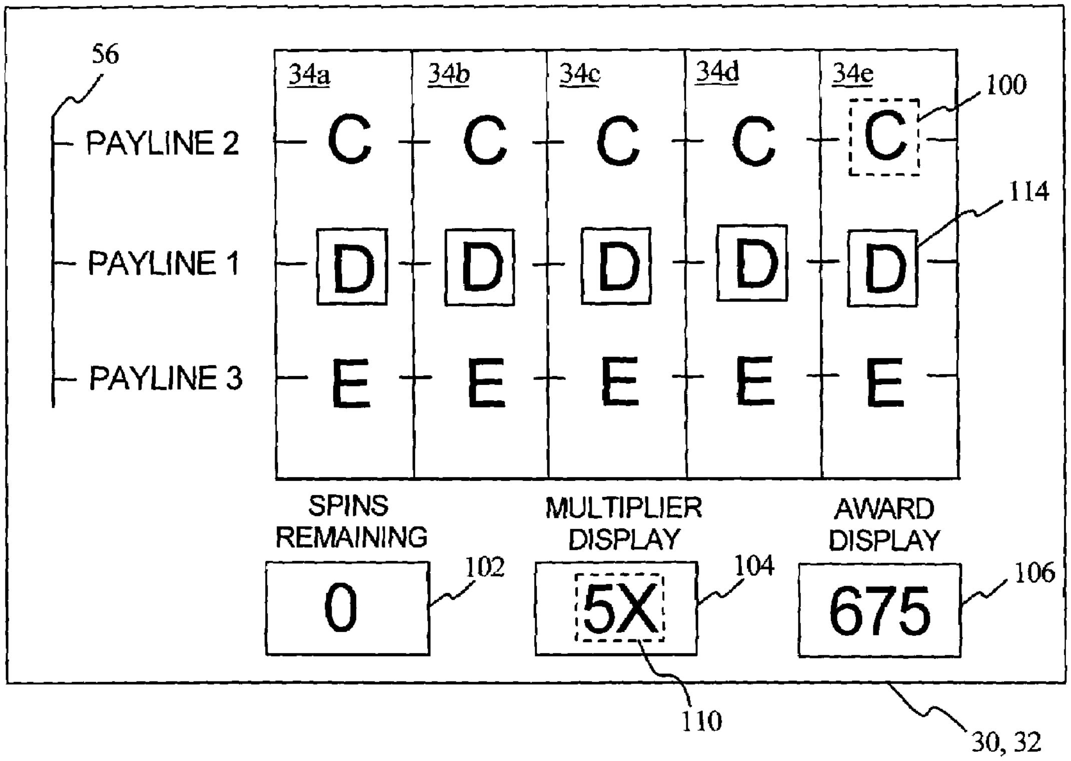

Referring to FIG. 4E, the player spins the reels for the final time in the bonus game. On their final free spin in the bonus game, the player obtained five "D" symbols 114 along payline one. In this particular game, five identical symbols across payline one pays an award of 100. Also, the multiplier is "5×" for this spin. Therefore, the award for this spin, 100, is multiplied by five to achieve a total award of 500 for this spin. The award is added to the total award in award display 106 to give the player a final award total of six hundred seventy-five for the bonus game. The player does not have any free spins remaining in the bonus game as indicated by spin remaining display 102. Thus, the bonus game ends. The final spin in this bonus game illustrates how one spin can result in a very large award.

The above example illustrated in FIGS. 4A to 4E, shows how the incremental effect of the multiplier 110 increases the level of player excitement and enjoyment in the bonus game. Potentially, a player might not obtain an award combination on any spin in the bonus game except for the last spin. Since the last spin has a larger multiplier than the previous spins, the player still will receive a large award. Therefore, the player's excitement builds as they progress further into the bonus game of the present invention because the potential for larger awards also builds based on the increasing multiplier.

In one embodiment of the present invention, the multiplier increments after each game, regardless of whether the player obtained a winning combination or not. Because the multiplier continues to increment even after non-winning combinations, the player still may obtain large awards in the bonus game, which increases the player's excitement and enjoyment of the game. For example, a bonus game begins with a multiplier of "1×" and increments by "1×" after each free spin. If a player does not obtain an award combination until the player's fourth free spin, the player still receives a large award because the multiplier in the fourth free spin is "4×."

In another embodiment of the present invention, the multiplier 110 increases by a predetermined amount that is greater than one after each free spin in the bonus game. For example, the multiplier begins a bonus game at "1×" and increases by "2×" after each free spin of the reels. After the first spin the multiplier increases to "3×," after the second spin the multiplier increases to "5×" and so forth. It should be appreciated that the multiplier can also increase by a predetermined multiplication factor. For example, the multiplier can increase by two or double after each free spin. The multiplier starts the bonus game at "1×" then increases to "2×" after the first free spin, "4×" after the second free spin and so forth. In a further embodiment, the multiplier increases by a random amount after each free spin. The random amount is determined by the processor. In yet another embodiment, the multiplier increases by a predetermined amount after a predetermined number of free spins greater than one. In still a further embodiment of the present invention, the multiplier increases by a random amount after a random number of free spins as determined by the processor.

Figure 5A:
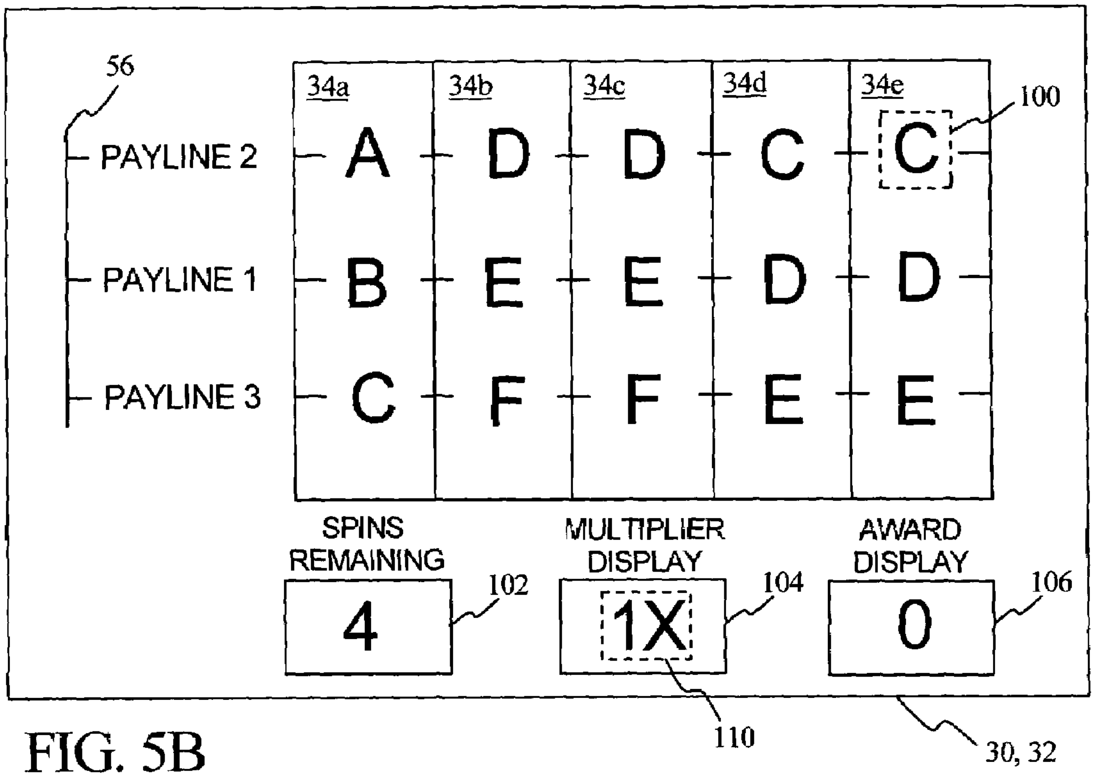
FIGS. 5A, 5B, 5C and 5D are enlarged front elevation views of another embodiment of the present invention illustrating having one or more incrementor symbols.
Figure 5B:
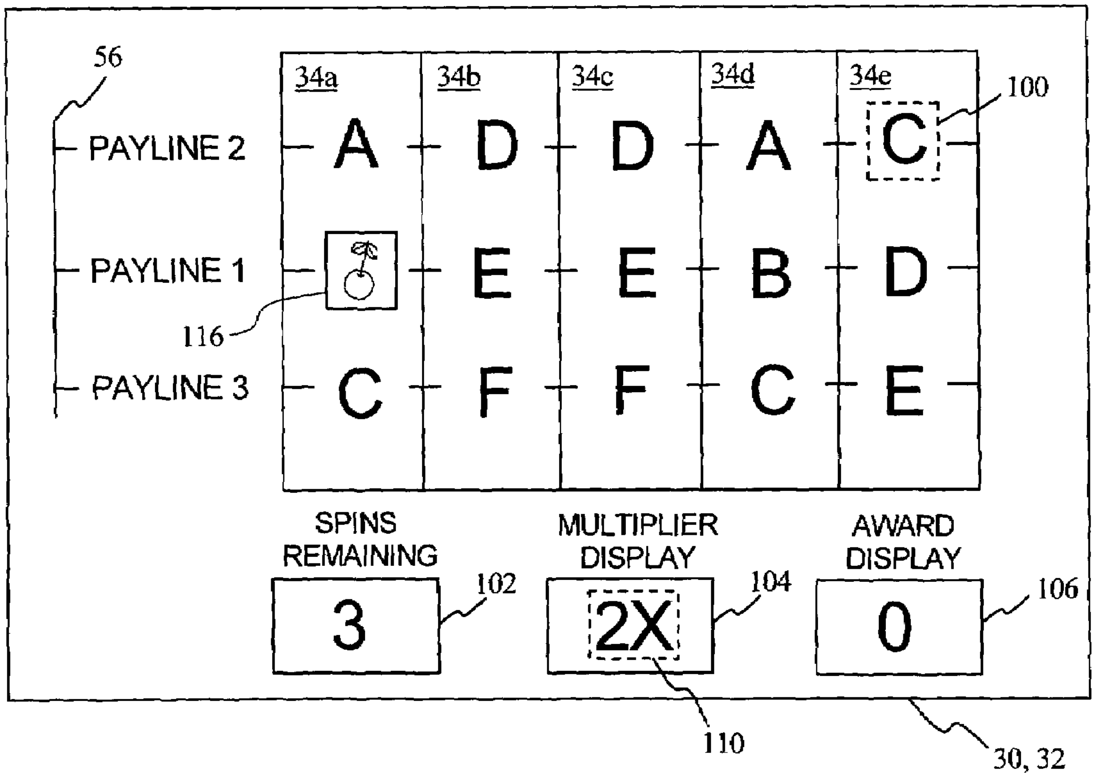
Figure 5C:
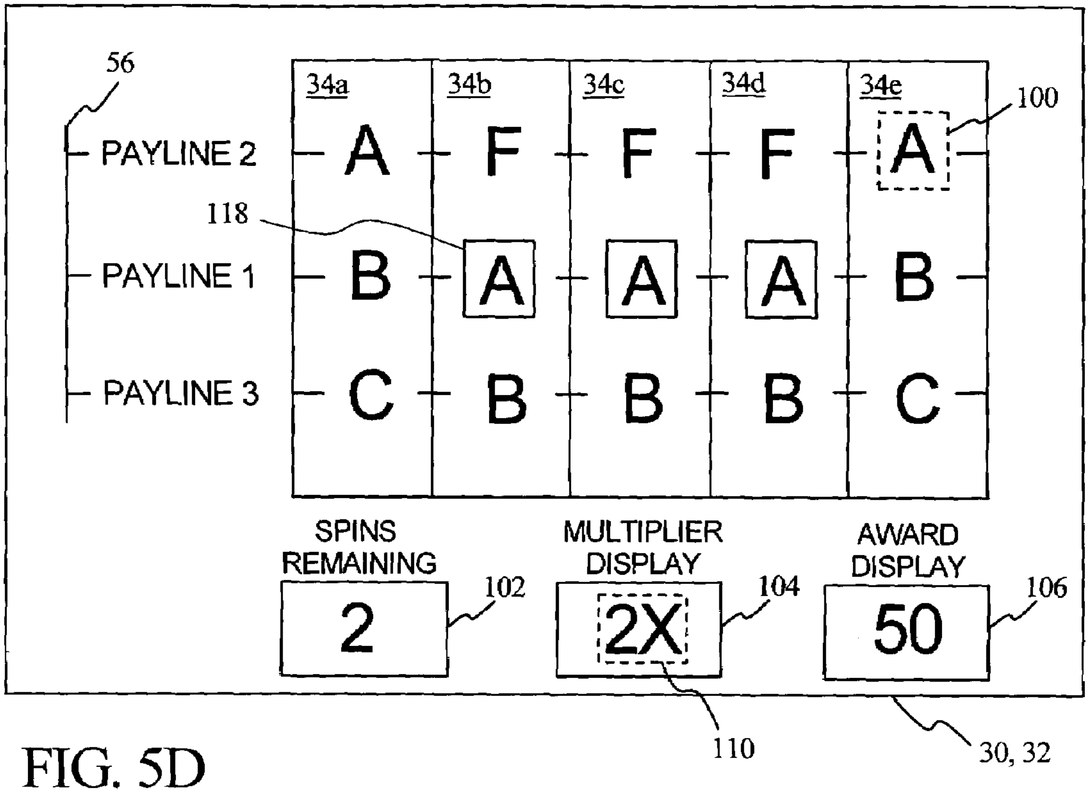

Referring now to FIGS. 5A, 5B, and 5C, another embodiment of the present invention is illustrated where the multiplier 110 additionally or alternatively increments when a particular symbol 100 or a symbol combination appears on the reels or any payline 56 associated with the reels. It should be appreciated that the symbol could appear on a specific payline or in any other manner desired by the game implementor. In this embodiment, the reels include symbols A through F, plus incrementing symbols 116 designated by a cherry symbol in this example. It should be appreciated that the incrementor may be any suitable symbol desired by the game implementor. A player spins the reels 34 attempting to obtain an award plus one or more incrementor symbols 116. The game may display player one incrementor at a time and accordingly increase the multiplier 110 by only one after a spin. However, it is contemplated that a player may receive more than one incrementor in a spin. In one embodiment, the incrementors are associated with probabilities such that one incrementor symbol has a greater probability of appearing on the reels than two or more incrementor symbols. In one embodiment, the multiplier 110 increments only when an incrementor symbol appears on a payline. In one alternative embodiment, there is a weighted probability of increasing the incrementor by more than one when an incrementor symbol is displayed.

In FIG. 5A, the bonus game begins with four spins as indicated by spins remaining display 102, a multiplier of "1×" as indicated by multiplier display 110, and a total award of zero as indicated by the award display 106. In FIG. 5B, the gaming device or player spins the reels 34 and obtains an incrementor symbol 116, designated by a cherry symbol in this example, on payline one. The player does not obtain a winning symbol combination in this spin. Therefore, the total award remains at zero as indicated by the award display 106 and the multiplier 110 increments by one from "1×" to "2×" as indicated by multiplier display 104. The multiplier remains "2×" until the player obtains another incrementor symbol on a payline.

Referring to FIG. 5C, the gaming device or player spins the reels 34 and does not obtain an incrementor symbol, or cherry symbol, on payline one. Therefore, the multiplier 110 remains unchanged as indicated by the multiplier display 104. However, the player does obtain a winning symbol combination in this spin. The winning symbol combination is three "A" symbols 118 on payline one and provides an award of twenty-five. Therefore, the award, twenty-five, is multiplied by the multiplier "2×" to obtain the total award of fifty as indicated by the award display 106. In this embodiment, only the award provided from a particular spin is multiplied by the multiplier for that spin.

Figure 5D:
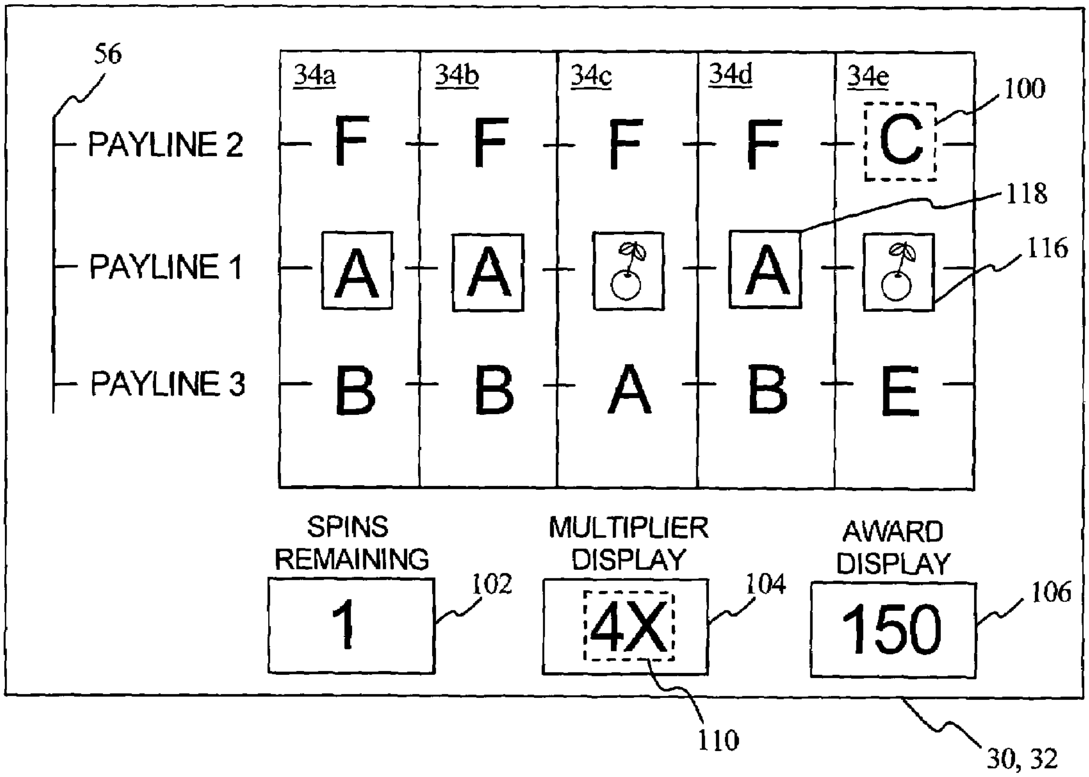

In FIG. 5D, the gaming device or player spins the reels. The player obtains three "A" symbols 118 along payline one. Also, the player obtained two incrementor symbols 116 on a payline in that spin. Thus, the multiplier 110 increments two times (for each incrementor symbol) or from "2×" to "4×." The player's award in the bonus game, twenty-five, is multiplied by four to achieve a total award for this spin of one hundred. The player's new total award in the bonus game becomes one hundred fifty, as indicated by award display 106. The player will continue to spin the reels 34 until there are no spins remaining in the bonus game.

Figure 6A:
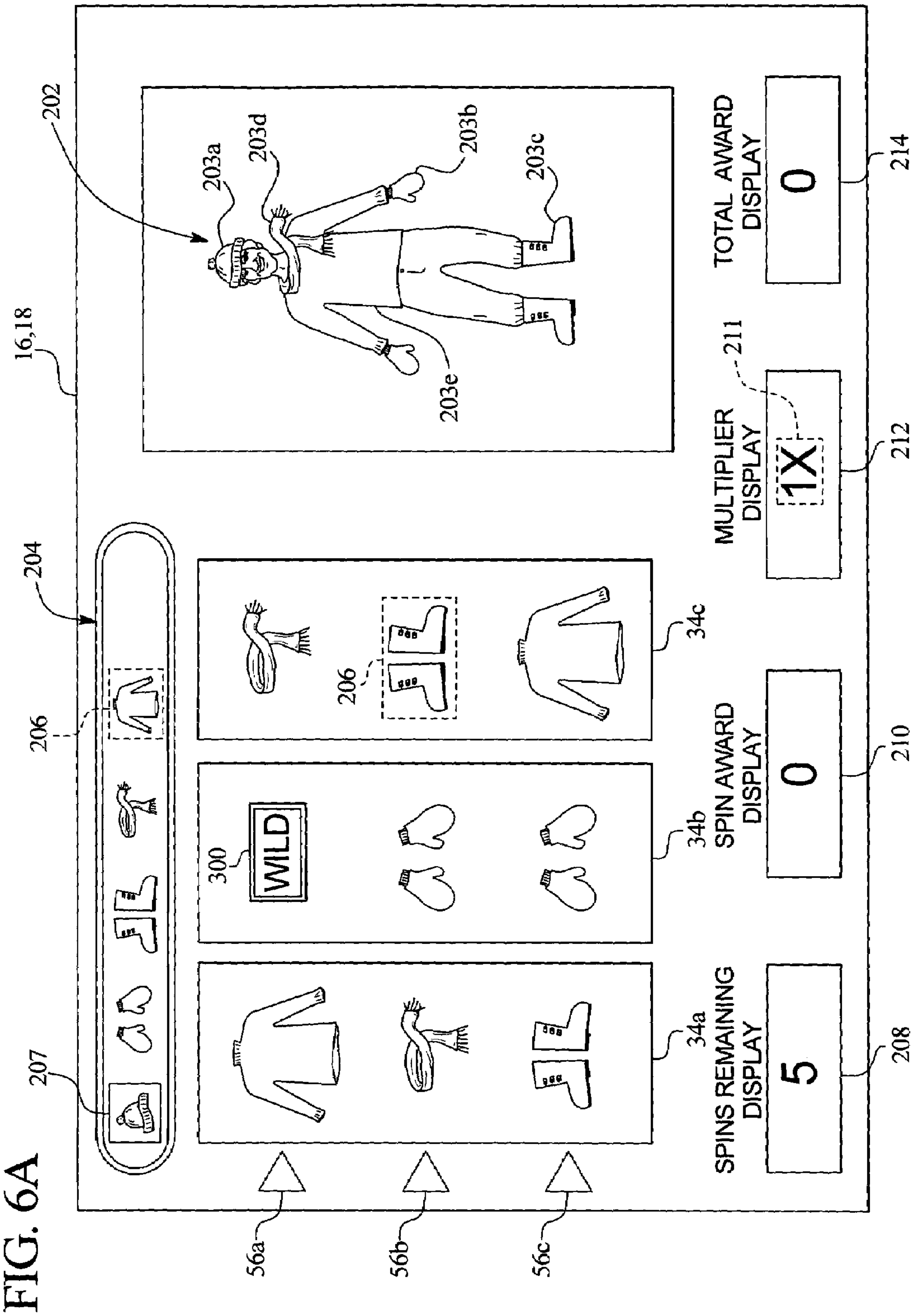
FIGS. 6A, 6B, 6C, 6D, 6E, 6F and 6G are enlarged front elevation views of an example of an alternative embodiment of the present invention.

Referring to FIG. 6A, an alternative embodiment of the present invention as illustrated where the gaming device includes a plurality of reels 34 having a plurality of symbols, an outcome and a plurality of sections 203 associated with the outcome. The symbols include a plurality of section indicator symbols 206 which cause the gaming device to obtain such as remove at least one of the sections 203 when a designated symbol combination including at least two of the section indicator symbols 200 is indicated on the reels. It should be appreciated that the sections may be obtained by adding a section, removing a section or altering the section in any suitable manner. It should also be appreciated that the symbols including the section indicator symbols 206 may be any suitable symbols, characters or images.

In one embodiment, the gaming device provides the outcome to the player when all the sections 203 associated with the outcome are obtained by obtaining the designated symbol combinations associated with each of the sections. The outcome may be any suitable outcome such as at least one award, value, multiplier, free game, game element or any other suitable award. The gaming device or player continues to activate the reels in the game until there are no free spins of the reels remaining or until all of the sections associated with the outcome are obtained in the game. The gaming device then reveals the outcome, provides the outcome to the player and ends the game. In another embodiment, the gaming device does not end the game but provides at least one additional outcome including a plurality of sections to the player when there are free spins remaining in the game. In this embodiment, the player continues to spin the reels until there are no free spins remaining.

In one embodiment, the gaming device includes a modifier such as a multiplier 211 which increments during the free spins of the reels. In the beginning of a game, the multiplier 211 is a predetermined or a randomly determined value which increments during the game. In one embodiment, the multiplier increments after each free spin of the reels. In another embodiment, the multiplier increments after a plurality of free spins of the reels. In a further embodiment, the multiplier increments after each designated combination of the section indicator symbols are indicated on the reels. In another embodiment, the multiplier increments after a plurality of the designated combinations of the section indicator symbols are indicated on the reels. It should be appreciated, that the multiplier 211 may increase, decrease or remain unchanged in one or more free spins of the reels. It should also be appreciated that the multiplier may increment by a predetermined amount, a randomly determined amount, an amount based on a wager made by a player or by any suitable amount.

In one embodiment, the gaming device multiplies the outcomes received in each spin of the reels with the value of the multiplier 211 in each of those spins of the reels and then sums the multiplied outcomes from those spins to provide a total outcome to the player in a game. In another embodiment, the gaming device provides the multiplier 211 to the player at the end of a game when all the sections 203 of the outcome are obtained and the total outcome is provided to the player in the game. The multiplier multiplies the total outcome provided to the player at the end of the game and thereby enhances any outcome received by the player in the game.

In another embodiment, the gaming device provides at least one free spin for each designated symbol combination including the section indicator symbols 206 indicated on the reels. In this embodiment, the gaming device provides one or more free spins of the reels to the player in the game when at least one designated symbol combination including the section indicator symbols is indicated on the reels. The free spins are added to the player's total free spins in the game. Therefore, the additional free spins enables the player to continue to spin the reels and possibly obtain all of the sections associated with the outcome in the game.

In a further embodiment, the symbols include at least one modifier symbol and at least one free spins symbol. In this embodiment, the modifier symbol is a different symbol from the section indicator symbol and causes the gaming device to increment the modifier such as the multiplier described above when one or more of the modifier symbols occur on the reels. Similarly, the free spins symbol is a different symbol than the section indicator symbol or symbols and causes the gaming device to provide at least one free spin to a player when one or more of the free spins symbols occur on the reels. It should be appreciated that the symbols may include at least one modifier symbol, at least one free spins symbol or any combination of modifier symbols and free spins symbols in a game.

In one embodiment, at least one payline 56 is associated with the reels. In this embodiment, the gaming device obtains at least one of the sections associated with the outcome when a designated symbol combination including the section indicator symbols is indicated on the paylines 56*a*, 56*b* or 56*c* associated with the reels. In another embodiment, the gaming device obtains at least one section associated with the outcome when the designated symbol combination including the section indicator symbol associated with that section is indicated on a plurality of the paylines associated with the reels. It should be appreciated that the designated symbol combination may be indicated on one, a plurality or all of the paylines associated with the reels.

In a further embodiment, the symbols on the reels include at least one wild symbol 300. In this embodiment, the gaming device automatically obtains all of the sections associated with the outcome when a designated symbol combination including the wild symbol 300 is indicated on the reels. In another embodiment, the gaming device obtains all of the sections associated with the outcome when a designated symbol combination including a plurality of the wild symbols 300 are indicated on the reels. It should be appreciated that the wild symbol may be any suitable symbol, character or image. It should also be appreciated that the wild symbol may cause the gaming device to obtain one, a plurality or all of the sections associated with the outcome in a game.

In one embodiment, the gaming device provides an award to the player for each of the sections which are obtained in the game. The award may be any suitable award desired by the game implementor. Additionally, the award may increase, decrease or remain unchanged for one, a plurality or all of the sections which are obtained in a game. Alternatively, the gaming device increments the award in one or a plurality of the free spins in the game. It should be appreciated that the award may increment by a predetermined amount or a randomly determined amount in the game.

In another embodiment, the gaming device indicates an order in which the sections must be obtained to reveal and provide the outcome to the player. For example, the gaming device indicates a first section associated with the outcome that must be obtained before the other sections can be obtained in the game. Therefore, the designated symbol combination including the section indicator symbol associated with the first section to be obtained must be indicated on the reels before the gaming device will obtain any of the other sections associated with the outcome. In this embodiment, if a designated symbol combination including a section indicator symbol associated with a different section than the section to be obtained is indicated on the reels, the gaming device will not obtain that section and does not provide an outcome such as an award or awards to the player in the game. This adds excitement and enjoyment for the player because the player now must root for a particular symbol combination to occur on the reels to proceed in the game.

In a further embodiment, if a designated symbol combination including a section indicator symbol associated with a different section than the section to be obtained is indicated on the reels, the gaming device does provide an outcome such as an award or awards to the player in the game. Therefore, the player still receives an outcome such as an award in the game even though the player did not obtain a designated symbol combination including the section indicator symbol associated with the section to be obtained in the game.

Referring to FIGS. 6A to 6G, an example of a game according to the present invention is illustrated where the gaming device displays three reels 34*a*, 34*b* and 34*c* to a player. The gaming also displays an outcome (not shown) and a plurality of sections associated with the outcome, wherein the sections in this example represent articles of winter clothing 203. In this example, the outcome is an award which the gaming device provides to the player when all of the designated articles of winter clothing are removed from the person 202. Specifically, the sections or articles of winter clothing include a hat 203*a*, a pair of gloves 203*b*, a pair of boots 203*c*, a scarf 203*d* and a coat 203*e*. Additionally, the gaming device provides an outcome such as an award to the player for each article of winter clothing that is removed from the person 202 in the game. Alternatively, the articles of winter clothing may be added or placed onto the person in the game when a designated symbol combination occurs on the reels. It should be appreciated that the articles of winter clothing (i.e., the sections) may be added, removed or obtained in any suitable manner desired by the game implementor.

In one embodiment shown in this example, the gaming device includes a section display such as the clothing display 204 that indicates the order or sequence in which each article of winter clothing must be removed from the person 202. Each article of winter clothing 203 is represented by corresponding reel symbols 206 in the section or clothing display 204. The gaming device indicates the specific article of winter clothing that must be removed from the person 202 at a given point in the game by moving indicator 207 over the corresponding clothing symbol 206 in the clothing display 204. In order to remove an article of winter clothing 203 from the person 202 (i.e., remove the section associated with the outcome), the player must obtain a designated combination or winning symbol combination including the section indicator symbols on the reels which represent the particular article of winter clothing indicated by the indicator 207. For example, if the indicator 207 indicates that the scarf 203*d* was the next item of winter clothing to be removed from the person 202, a designated symbol combination including three scarf symbols must occur on payline 56*b* to remove that article of winter clothing from the person 202. If the player obtained a different combination of section indicator symbols or articles of winter clothing such as three boot symbols, the gaming device would not remove any of the articles of winter clothing from the person and the player would have to spin the reels again to attempt to obtain the specific combination of three scarf symbols on payline 56*b*.

In this example, the symbols on the reels include a plurality of wild symbols 300. If three wild symbols are indicated on payline 56*b* in one of the free spins of the reels, the gaming device automatically removes all of the designated articles of winter clothing 203 from the person 202 and provides the outcome or award to the player. Alternatively, the player could remove all of the articles of winter clothing from the person 202 by independently obtaining winning symbol combinations on payline 56*b* including each of the articles of winter clothing in the order specified in the section or clothing display 204.

Additionally, in this example, once a particular article of winter clothing is removed from the person, the article of winter clothing (i.e., the symbol representing the article of winter clothing) is eliminated or removed from the reels for the remaining number of free spins in the game. This further enhances the players chances of subsequently indicating a designated combination including a particular article of winter clothing because there are less symbols on the reels. Also, the players chances of revealing the outcome also increase as the game progresses and more symbol are eliminated from the reels.

In this example, the gaming device provides the player with five free spins of the game as indicated in the spins remaining display 208. The gaming device also provides a base multiplier of 1× as indicated by multipliers 212. The players total award at the beginning of the game is zero as indicated by the total award display 214.

Figure 6B:
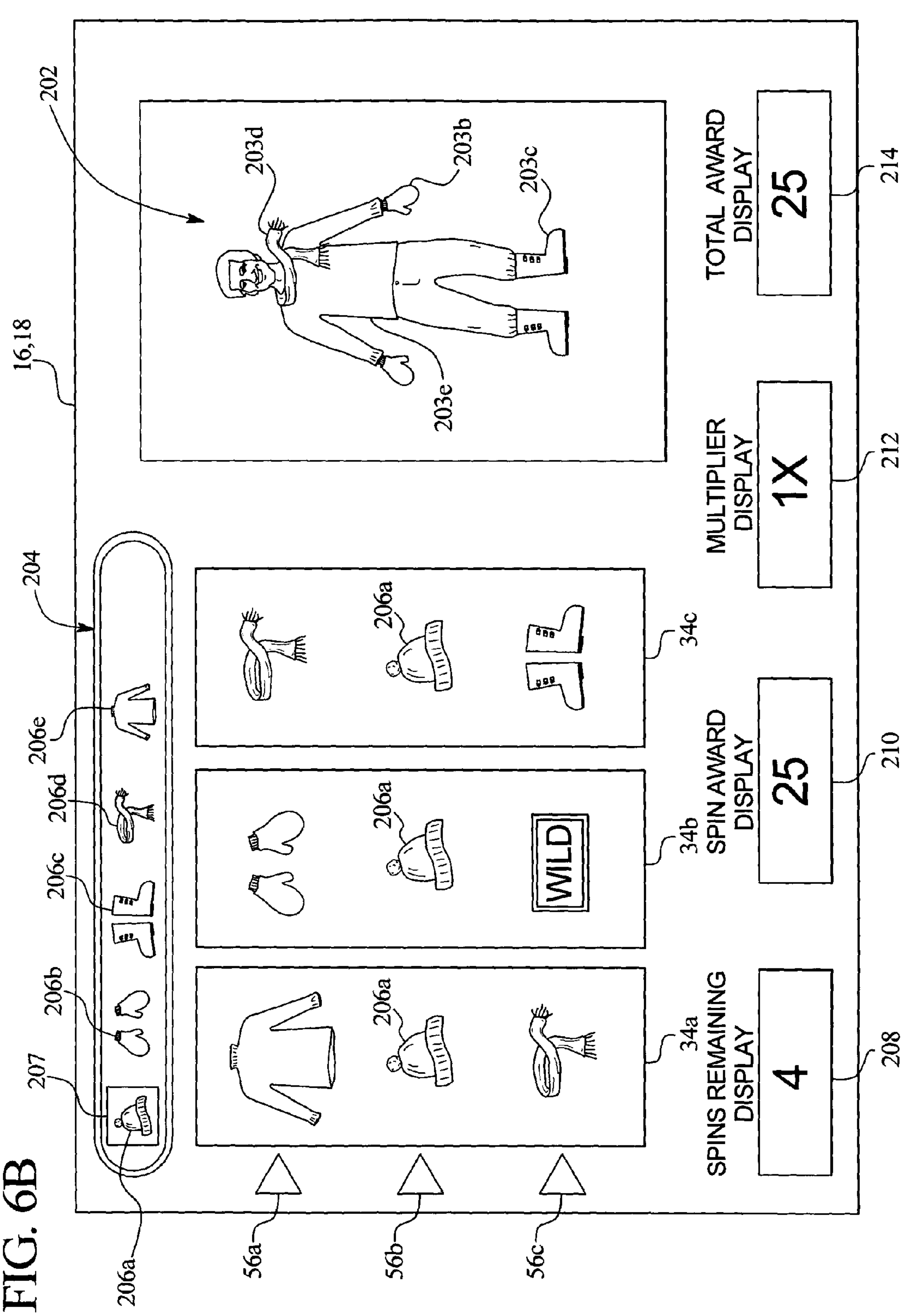

Referring to FIG. 6B, the gaming device activates the reels for the first time in the game. As indicated by the clothing display 204 the indicator 207 indicates that the player must first obtain a designated or winning symbol combination including three hat symbols 206*a* to remove the first article of clothing (i.e., the hat) from the person 202. In this spin, three hat symbols 206*a* are indicated on payline 56*b*. Therefore, the player obtained the winning symbol combination including the three hat symbols as indicated by indicator 207 in the clothing display 204. Therefore, the gaming device removes the hat 203*a* from the person 202 as shown in FIG. 6B, and provides the player with an award of twenty-five as indicated by the spin award display 210. The spin award of twenty-five is multiplied by the multiplier of 1× for this spin as indicated by the multiplier display 212 to give the player a spin award of twenty-five. This award is added to the player's total award of zero to give the player a new total award of twenty-five as indicated by the total award display 214.

Figure 6C:
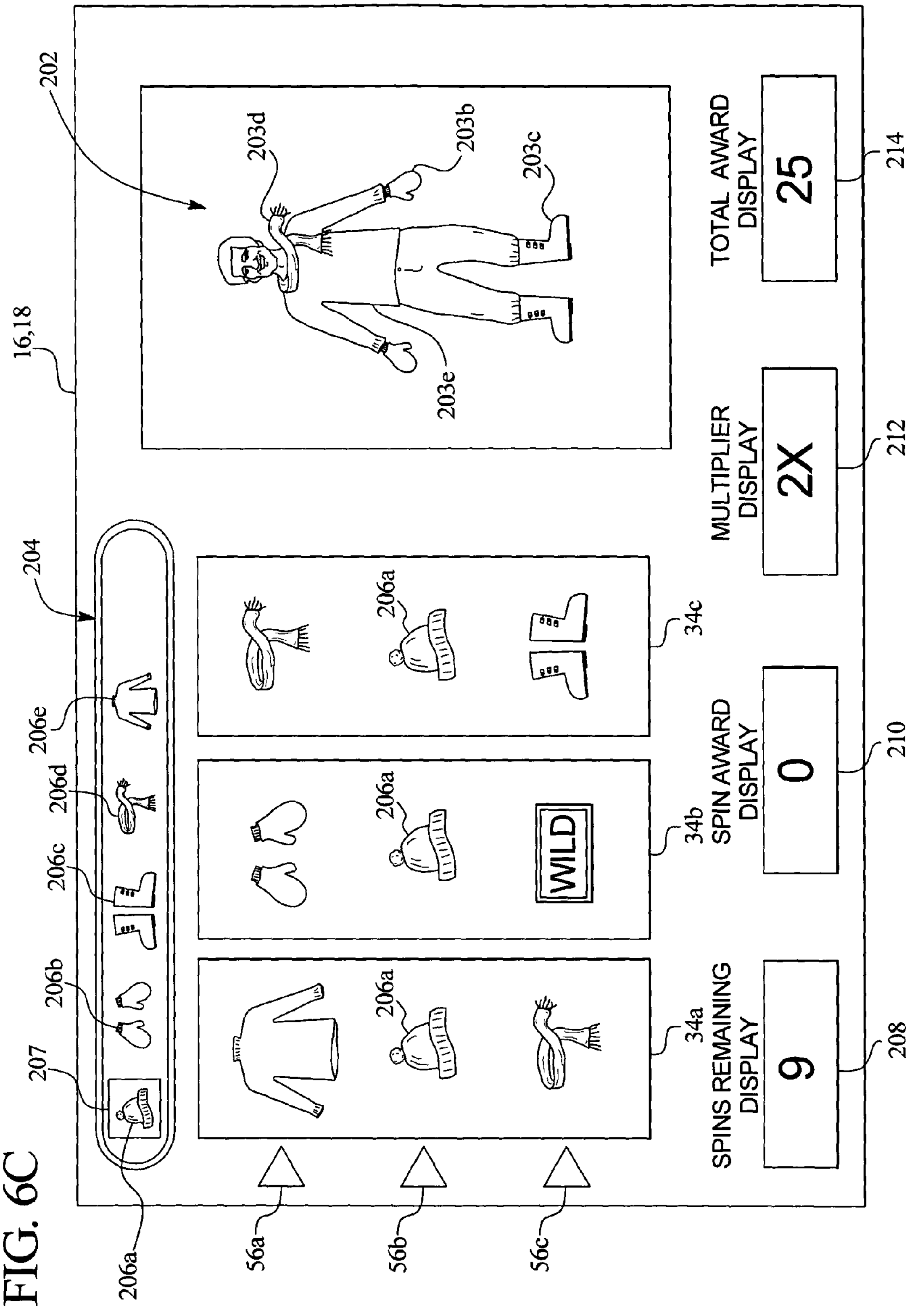

According to FIG. 6C, because the player obtained a designated symbol combination in the game, the gaming device provides five more free spins of the reels to the player as indicated by the spins remaining display 208. Additionally, the gaming device increments the multiplier by one to provide a new multiplier of 2× as indicated by the multiplier display 212. In this example, the gaming device provides the player with five additional free spins and increments the multiplier by one for each designated symbol combination including one of the section indicator symbols or clothing symbols in the game. In addition, the hat symbol will now be eliminated or removed from the reels for the rest of the free spins in the game.

Figure 6D:
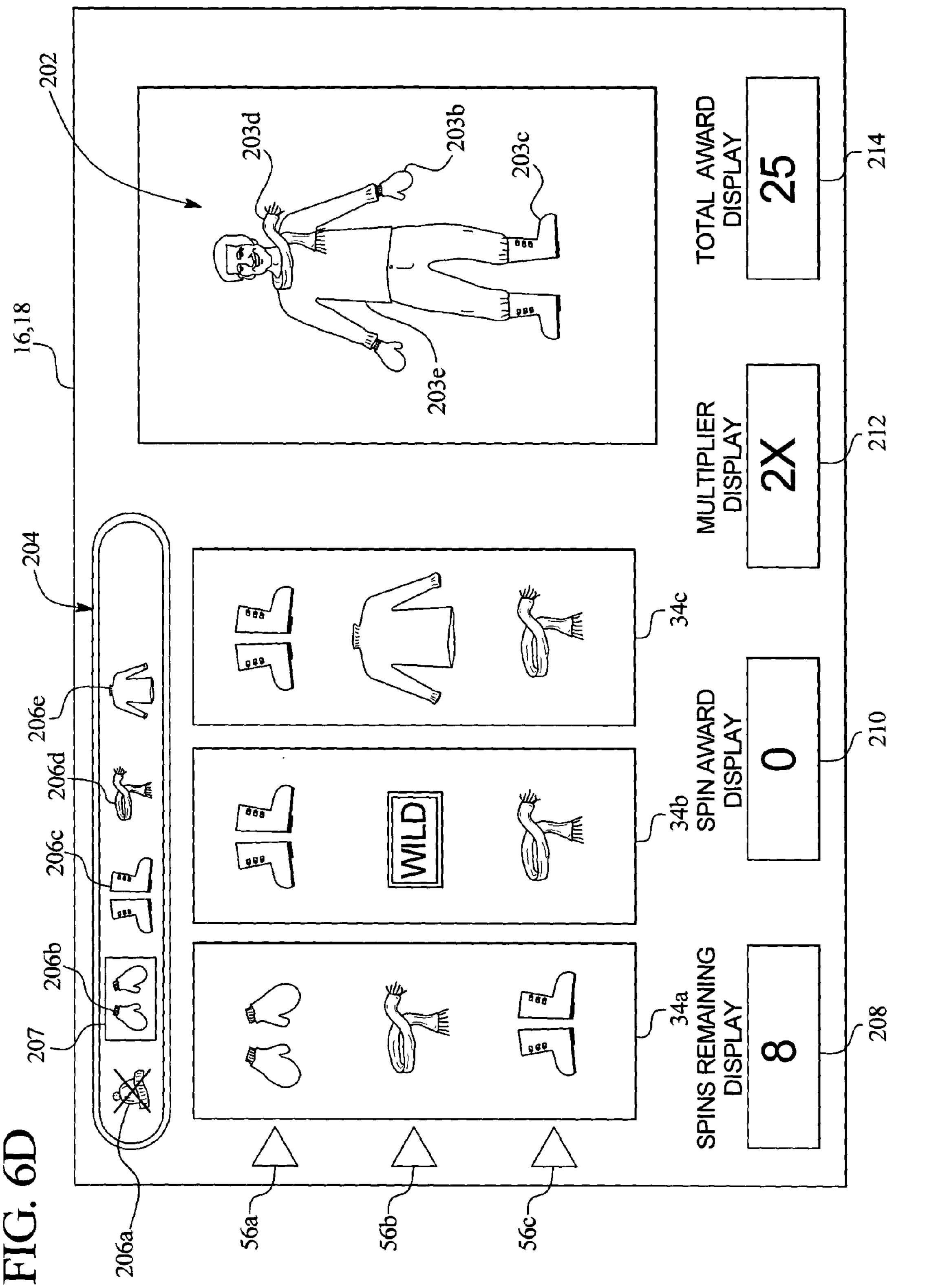

According to FIG. 6D, the gaming device or player activates the reels for a second time in the game. In this spin, the player must obtain a designated symbol combination including three glove symbols 206*b* as indicated by the indicator 207 in the clothing display 204. Therefore, a winning symbol combination including three of the glove symbols 206*b* must be indicated on the reels to enable the player to continue to play the game and possibly reveal and obtain the outcome. In this spin, the player did not achieve a winning symbol combination including three gloves symbols. Thus, the player does not obtain an award as indicated by the spin award display 210. The player now has eight spins remaining in the game as indicated by the spins remaining display 208.

Figure 6E:
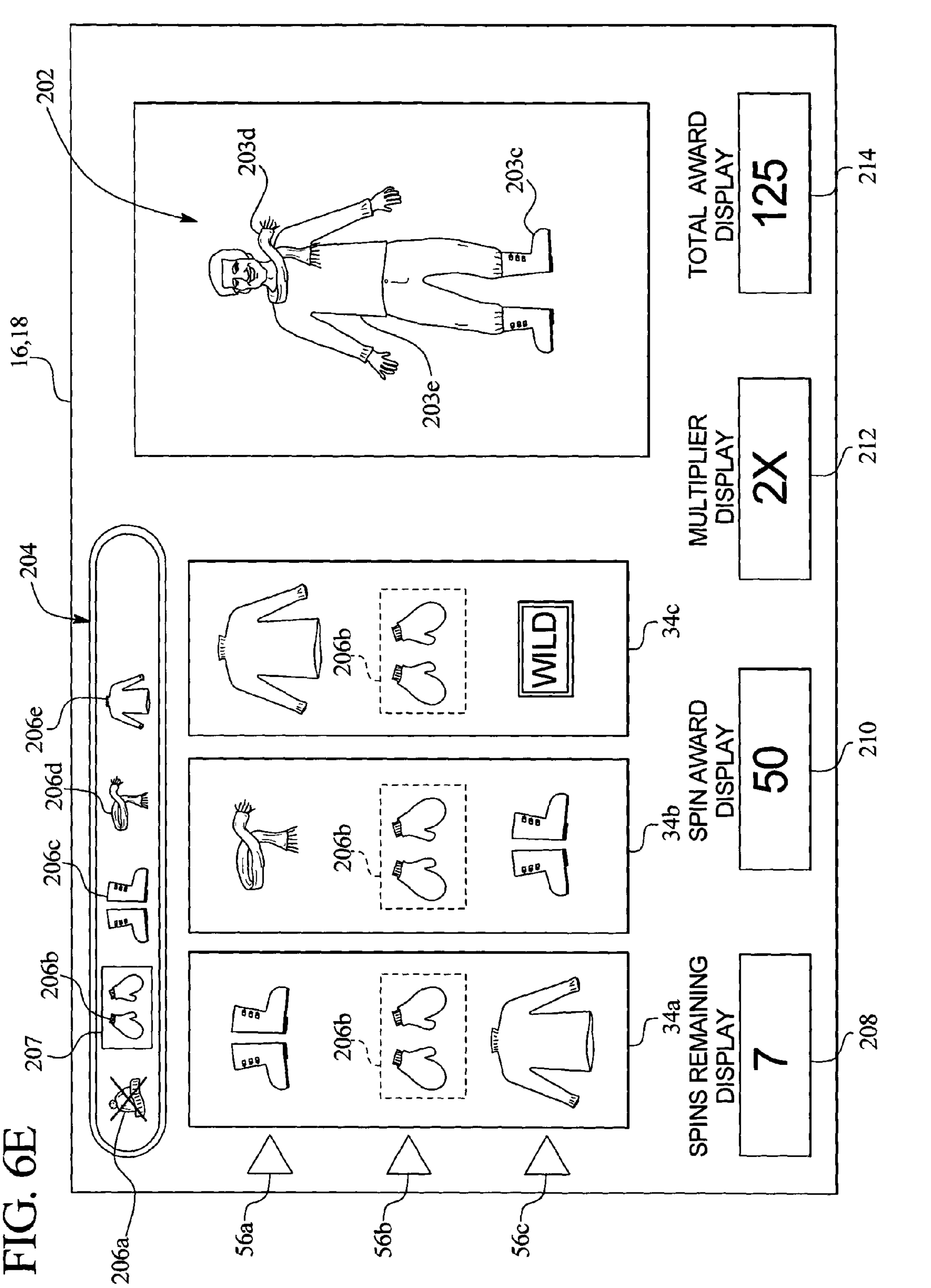

Referring to FIG. 6E, the gaming device or the player activates the reels for a third time in the game and three glove symbols 206*b* are indicated on the payline 56*b* on the reels. Therefore, the player obtained a winning symbol combination including the glove symbol as indicated by indicator 207 in clothing display 204. The gaming device removes the pair of gloves from the person 202 as shown in FIG. 6E. Additionally, the gaming device provides an award of fifty to the player for obtaining the specified winning symbol combination as indicated by the spin award display 210. The spin award of fifty is multiplied by the multiplier 2× as indicated in the multiplier display 212 to provide the player with an award of one hundred in this spin. The award of one hundred is added to the player's previous total award of twenty-five to give the player a new total award of one hundred twenty-five as indicated in the total award display 214.

Figure 6F:
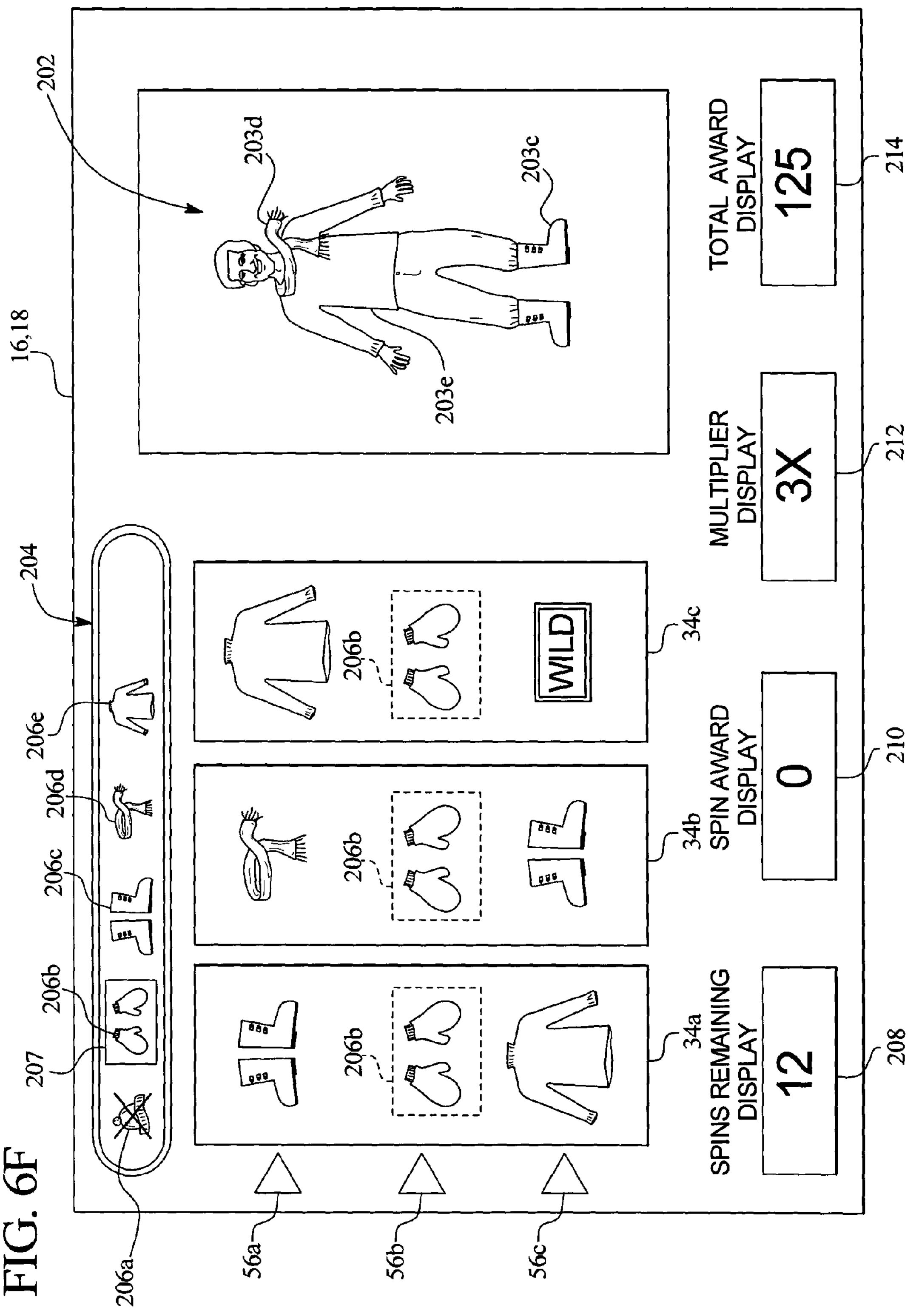

Referring to FIG. 6F, the gaming device provides the player with five more free spins in the game as indicated by the spins remaining display 208. Additionally, the gaming device increments the multiplier by one to 3× as indicated by the multiplier display 212. As a result, the player now has twelve spins remaining in the game and a multiplier of 3×. The gaming device also removes or eliminates the glove symbols from the reels for the remaining free spins in the game. By removing the glove symbols from the reels, the player has a greater opportunity of obtaining a winning symbol combination on the reels including the next symbol indicated in the clothing display 204, which is the pair of boots symbol 206*c*.

Figure 6G:
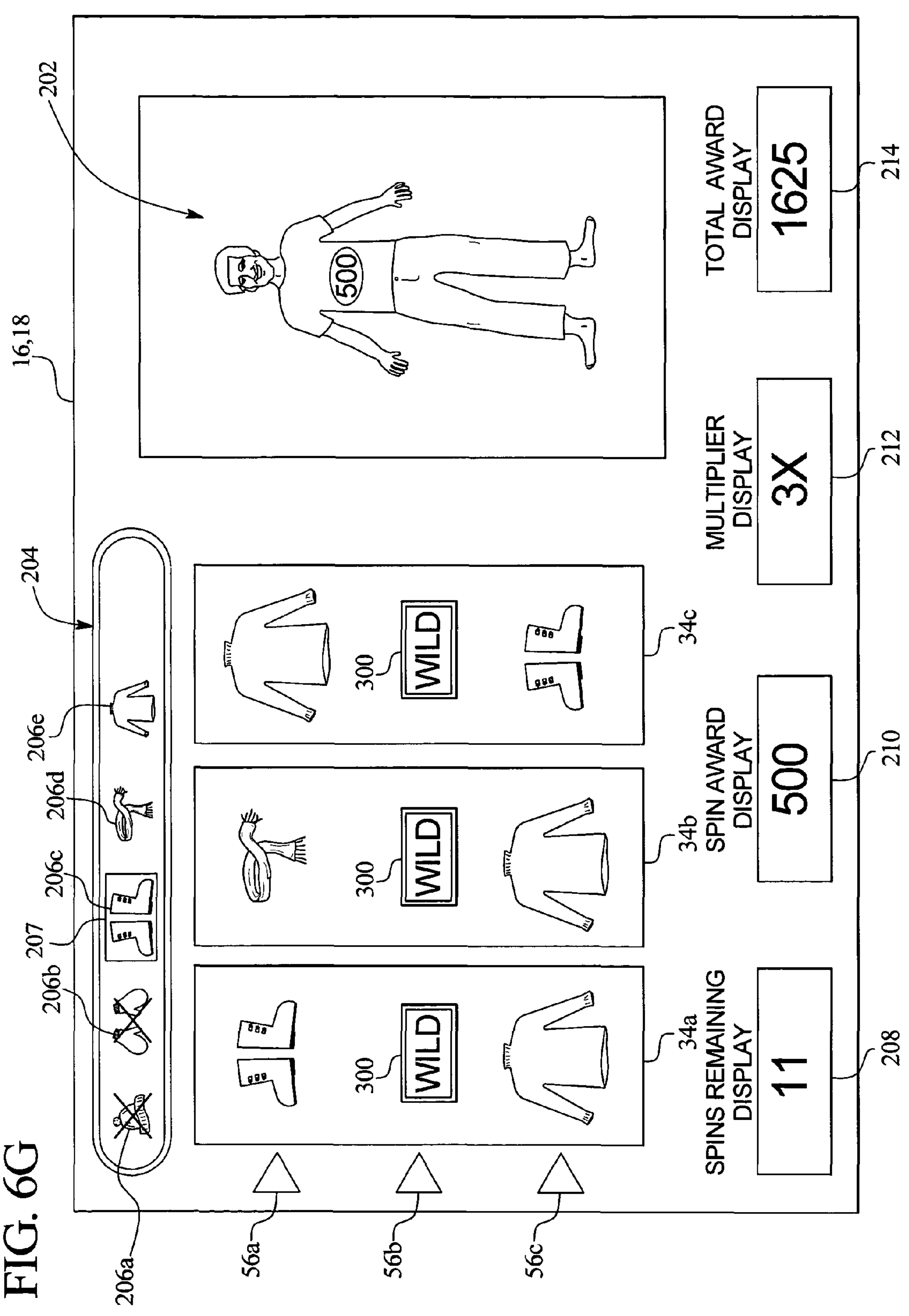

Referring now to FIG. 6G, the gaming device eliminates the glove symbols 206*b* from the reels as indicated in the clothing display 204. Additionally, the gaming device moves the indicator 207 to indicate the next article of clothing of winter clothing 206*c* to be removed from the person 202, which is the pair of boots 203*c*. The gaming device or the player spins the reels again in the game and the reels indicate three wild symbols 300 on payline 56*b*. The winning symbol combination including the three wild symbols causes the gaming device to automatically remove all of the articles of winter clothing 203 (i.e., the items of clothing indicated in the clothing display 204) from the person 202 to reveal or show the outcome to the player. In this example, the outcome is an award of five hundred as indicated on the person's shirt in FIG. 6G.

The award of five hundred is added to the players spin award as indicated by the spin award display 210. The award of five hundred is multiplied by the multiplier 3× as indicated by the multiplier display 212 to give the player an award of one thousand five hundred for the spin. The award of one thousand five hundred is added to the player's previous total award of one hundred twenty-five to give the player a new total award of one thousand six hundred twenty-five as indicated by the total award display 214. In this example, the game ends when the player does not have any free spins remaining or when the player removes all of the sections to reveal the outcome. Therefore, because the player removed all the sections from the person to reveal the outcome, the gaming device provides the player with the total award indicated in the total award display and the game ends.

As described above, in another embodiment, the gaming device provides the player with another outcome when the player has at least one free spin remaining in the game. In this embodiment, the gaming device displays a new person 202 wearing the same or different winter clothing items. The new outcome may be pre-determined, randomly determined or determined according to any suitable determination method. In this embodiment, the player plays the game as described above until the player does not have any free spins remaining in the game.

It should be appreciated that the present invention could be employed in other games such as poker, blackjack, keno and other primary or secondary games.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A gaming device comprising:

at least one display device configured to display:

(i) a plurality of sections, a section outcome associated with said plurality of sections, and (ii) a plurality of reels including a plurality of symbols, said symbols including a plurality of different section indicator symbols, wherein each of said section indicator symbols is associated with one of the sections; and a processor programmed to operate with said at least one display device to:

(a) provide a predetermined number of free spins of the reels to a player upon an occurrence of a triggering event, said predetermined number being at least two, (b) for each of the provided free spins until all of the sections are obtained:

(i) activate the reels, (ii) obtain at least one of the sections if a designated combination of the section indicator symbols associated with said section occurs on the reels, and (iii) increment a modifier if said designated combination of the section indicator symbols occurs on the reels, and (c) if all of the sections are obtained within said provided number of free spins:

(i) display the section outcome associated with the plurality of sections, and (ii) provide the section outcome associated with the plurality of sections to the player, wherein the section outcome is modified by the modifier.

2. The gaming device of claim 1, wherein the symbols include at least one wild symbol.

3. The gaming device of claim 2, which includes a wild symbol combination including at least two of said wild symbols, wherein all of the sections are obtained when said wild symbol combination occurs on the reels.

4. The gaming device of claim 1, which includes a plurality of modifiers.

5. The gaming device of claim 4, wherein the modifiers include multipliers.

6. The gaming device of claim 5, wherein at least two of the multipliers are different.

7. The gaming device of claim 1, wherein the modifier includes a multiplier.

8. The gaming device of claim 7, wherein the multiplier increments for each designated combination of the section indicator symbols that occur on the reels.

9. The gaming device of claim 7, wherein multiplier increments for a plurality of designated combinations of the section indicator symbols that occur on the reels.

10. The gaming device of claim 7, wherein the multiplier increments by a predetermined amount.

11. The gaming device of claim 7, wherein the multiplier increments by a randomly determined amount.

12. The gaming device of claim 1, wherein the section outcome includes at least one of the following: an award, a value, a modifier, a free spin, a free game and a game element.

13. The gaming device of claim 1, wherein at least one free spin of the reels is provided to the player for each designated combination of the section indicator symbols that occurs on the reels.

14. The gaming device of claim 1, wherein at least one free spin of the reels is provided to the player for a plurality of designated combinations of the section indicator symbols that occur on the reels.

15. The gaming device of claim 1, which includes at least one payline associated with the reels, wherein at least one of the sections is obtained when the designated symbol combination including the section indicator symbol associated with said section occurs on the payline.

16. The gaming device of claim 1, which includes a plurality of paylines associated with the reels, wherein at least one of the sections is obtained when the designated symbol combination including the section indicator symbol associated with said section occurs on the paylines.

17. A gaming device comprising:

at least one display device configured to display:

(i) a plurality of sections;

(ii) a plurality of reels including a plurality of symbols, said symbols including a plurality of different section indicator symbols, each of said section indicator symbols associated with one of said sections; and (iii) a plurality of designated symbol combinations, said designated symbol combinations including at least two of said section indicator symbols, wherein each of said designated symbol combinations causes at least one of the sections to be obtained when said designated symbol combination is indicated on the reels; and a processor programmed to operate with said at least one display device to provide a predetermined number of free spins to a player, said predetermined number being at least two, wherein the reels are activated for each of said provided free spins until all the sections are obtained, and wherein if all of the sections are obtained by the indication of the designated symbol combinations on the reels within said provided number of free spins, a section outcome associated with said plurality of sections is displayed and provided to the player.

18. The gaming device of claim 17, wherein the symbols include at least one wild symbol.

19. The gaming device of claim 17, which includes a wild symbol combination including at least two of said wild symbols, wherein all of the sections are obtained when said wild symbol combination is indicated on the reels.

20. The gaming device of claim 17, which includes at least one multiplier.

21. The gaming device of claim 20, wherein the multiplier increments for each designated combination of the section indicator symbols indicated on the reels.

22. The gaming device of claim 20, wherein the multiplier increments for a plurality of designated combinations of the section indicator symbols indicated on the reels.

23. The gaming device of claim 20, wherein the multiplier increments by a predetermined amount.

24. The gaming device of claim 20, wherein the multiplier increments by a random amount.

25. The gaming device of claim 17, wherein the section outcome includes at least one of the following: an award, a value, a modifier, a free spin, a free game and a game element.

26. The gaming device of claim 17, wherein at least one free spin of the reels is provided to the player for each designated combination of the section indicator symbols indicated on the reels.

27. The gaming device of claim 17, wherein at least one free spin of the reels is provided to the player for a plurality of designated combinations of the section indicator symbols indicated on the reels.

28. The gaming device of claim 17, which includes at least one payline associated with the reels, wherein at least one of the sections is obtained when one of the designated symbol combinations is indicated on the payline.

29. The gaming device of claim 17, which includes a plurality of paylines associated with the reels, wherein at least one of the sections is obtained when one of the designated symbol combinations is indicated on the paylines.

30. A gaming device comprising:

at least one display device configured to display:

(i) a plurality of sections, a section outcome associated with said plurality of sections, and (ii) a plurality of reels including a plurality of symbols, said symbols including a plurality of different section indicator symbols, wherein each of said section indicator symbols is associated with one of the sections; and a processor programmed to operate with said at least one display device to:

(a) provide a predetermined number of free spins of the reels to a player upon an occurrence of a triggering event, said predetermined number being at least two, (b) for each of the provided free spins until all of the sections are obtained:

(i) activate the reels, (ii) obtain at least one of the sections if a designated combination of the section indicator symbols associated with said section occurs on the reels, (iii) increment a modifier if said designated combination of the section indicator symbols occurs on the reels, and (iv) eliminate said section indicator symbols included in said designated combination of section indicator symbols from the reels if said designated combination of section indicator symbols occurs on the reels, and (c) if all of the sections are obtained within said provided number of free spins:

(i) display the section outcome associated with the plurality of sections, and (ii) provide has been the section outcome associated with the plurality of sections to the player, wherein the section outcome is modified by the modifier.

31. The gaming device of claim 30, wherein the symbols include at least one wild symbol.

32. The gaming device of claim 31, which includes a wild symbol combination including at least two of said wild symbols, wherein all of the sections are obtained when said wild symbol combination occurs on the reels.

33. The gaming device of claim 30, which includes a plurality of modifiers.

34. The gaming device of claim 33, wherein the modifiers include multipliers.

35. The gaming device of claim 34, wherein at least two of the multipliers are different.

36. The gaming device of claim 30, wherein the modifier includes a multiplier.

37. The gaming device of claim 36, wherein the multiplier increments for each designated combination of the section indicator symbols that occur on the reels.

38. The gaming device of claim 36, wherein multiplier increments for a plurality of designated combinations of the section indicator symbols that occur on the reels.

39. The gaming device of claim 36, wherein the multiplier increments by a predetermined amount.

40. The gaming device of claim 36, wherein the multiplier increments by a randomly determined amount.

41. The gaming device of claim 30, wherein the section outcome includes at least one of the following: an award, a value, a modifier, a free spin, a free game and a game element.

42. The gaming device of claim 30, wherein at least one free spin of the reels is provided to the player for each designated combination of the section indicator symbols that occurs on the reels.

43. The gaming device of claim 30, wherein at least one free spin of the reels is provided to the player for a plurality of designated combinations of the section indicator symbols that occur on the reels.

44. The gaming device of claim 30, which includes at least one payline associated with the reels, wherein at least one of the sections is obtained when the designated symbol combination including the section indicator symbol associated with said section occurs on the payline.

45. The gaming device of claim 30, which includes a plurality of paylines associated with the reels, wherein at least one of the sections is obtained when the designated symbol combination including the section indicator symbol associated with said section occurs on the paylines.

46. A method for operating a gaming device, said method comprising;

(a) displaying a plurality of sections, said plurality of sections associated with a section outcome;

(b) displaying a plurality of reels having a plurality of symbols, said symbols including a plurality of different section indicator symbols, wherein said section indicator symbols are associated with each of said sections;

(c) providing to a player a predetermined number of free spins of the reels, said predetermined number being at least two; and (d) for each of the provided free spins until all of the sections are obtained:

(i) activating the reels;

(ii) determining whether a designated combination of said section indicator symbols is indicated on the reels;

(iii) obtaining at least one of the sections if said designated combination of the section indicator symbols is indicated on the reels; and (iv) eliminating the section indicator symbols included in said designated symbol combination from the reels if said designated symbol combination is indicated on the reels; and (d) if all of the sections have been obtained within said provided number of free spins, providing the section outcome associated with said plurality of sections to the player.

47. The method of claim 46, wherein obtaining at least one of the sections if said designated combination of the section indicator symbols is indicated on the reels includes removing the section.

48. The method of claim 46, which includes obtaining all of the sections when a designated symbol combination including at least one wild symbol occurs on the reels.

49. The method of claim 46, which includes incrementing a multiplier for each designated combination of the section indicator symbols that occurs on the reels.

50. The method of claim 49, which includes incrementing the multiplier for a plurality of designated combinations of the section indicator symbols that occur on the reels.

51. The method of claim 49, which includes incrementing the multiplier by a predetermined amount.

52. The method of claim 49, which includes incrementing the multiplier by a random amount.

53. The method of claim 46, which includes providing at least one free spin of the reels to the player for each designated combination of the section indicator symbols that occurs on the reels.

54. The method of claim 46, which includes providing at least one free spin of the reels to the player for a plurality of the designated combinations of the section indicator symbols that occur on the reels.

55. The method of claim 46, wherein obtaining at least one of the sections includes obtaining at least one of the sections if said designated combination of the section indicator symbols occurs on a payline associated with the reels.

56. The method of claim 46, wherein the obtaining at least one of the sections includes obtaining at least one of the sections if said designated combination of the section indicator symbols occurs on a plurality of paylines associated with the reels.

57. The method of claim 46, which is provided to the player through a data network.

58. The method of claim 57, wherein the data network is an internet.

59. The gaming device of claim 1, wherein the triggering event is associated with at least one of the symbols or a combination of said symbols occurring on the reels.

60. The gaming device of claim 1, wherein a plurality of designated combinations of said symbols are each associated with a winning symbol combination outcome.

61. The gaming device of claim 60, wherein for each of said free spins, if any of said designated combinations of said symbols occur on the reels, said processor is programmed to provide to the player the winning symbol combination outcome associated with each of said designated combinations of symbols which occurs on the reels.

62. The gaming device of claim 61, wherein each winning symbol combination outcome provided to the player is modified by the modifier in said free spin.

63. The gaming device of claim 60, wherein the winning symbol combination outcome includes at least one of the following: an award, a value, a modifier, a free spin, a free game and a game element.

64. The gaming device of claim 17, wherein a plurality of winning symbol combinations are each associated with a winning symbol combination outcome.

65. The gaming device of claim 64, wherein for each winning symbol combination indicated on the reels, said processor is programmed to provide the winning symbol combination outcome associated with said winning symbol combination to the player.

66. The gaming device of claim 64, wherein the winning symbol combination outcome includes at least one of the following: an award, a value, a modifier, a free spin, a free game and a game element.

67. The gaming device of claim 30, wherein the triggering event is associated with at least one of the symbols or a combination of said symbols occurring on the reels.

68. The gaming device of claim 30, wherein a plurality of designated combinations of said symbols are each associated with a winning symbol combination outcome.

69. The gaming device of claim 68, wherein for each of said free spins, if any of said designated combinations of said symbols occur on the reels, said processor is programmed to provide to the player the winning symbol combination outcome associated with each of said designated combinations of symbols which occurs on the reels.

70. The gaming device of claim 69, wherein each winning symbol combination outcome provided to the player is modified by the modifier in said free spin.

71. The gaming device of claim 68, wherein the winning symbol combination outcome includes at least one of the following: an award, a value, a modifier, a free spin, a free game and a game element.

72. The method of claim 46, wherein a plurality of designated combinations of said symbols are each associated with a winning symbol combination outcome.

73. The method of claim 72, which includes, for each of said free spins, providing the winning symbol combination outcome associated with each of said designated combinations of symbols which occurs on the reels.

74. The method of claim 72, wherein the winning symbol outcome includes at least one of the following: an award, a value, a modifier, a free spin, a free game and a game element.

* * * * *

UNITED STATES PATENT AND TRADEMARK OFFICE

CERTIFICATE OF CORRECTION

PATENT NO. : 7,381,134 B2
APPLICATION NO. : 10/650024
DATED : June 3, 2008
INVENTOR(S) : Ryan W. Cuddy et al.

It is certified that error appears in the above-identified patent and that said Letters Patent is hereby corrected as shown below:

In Claim 46, Column 21, Line 19 change "(d)" to --(e)--.

Signed and Sealed this

Seventh Day of October, 2008

JON W. DUDAS
*Director of the United States Patent and Trademark Office*